US00RE39745E

(19) United States
(12) Reissued Patent
Setogawa et al.

(10) Patent Number: US RE39,745 E
(45) Date of Reissued Patent: Jul. 24, 2007

(54) RECORDING MEDIUM RETAINING DATA FOR MENU CONTROL, MENU CONTROL METHOD AND APPARATUS

(75) Inventors: Toshiaki Setogawa, Kanagawa (JP); Ayato Nakagawa, Kanagawa (JP); Tsuyoshi Oda, Tokyo (JP)

(73) Assignee: Sony Corporation, Tokyo (JP)

(21) Appl. No.: 10/960,896

(22) Filed: Oct. 6, 2004

Related U.S. Patent Documents

Reissue of:
(64) Patent No.: 6,469,718
Issued: Oct. 22, 2002
Appl. No.: 09/137,277
Filed: Aug. 20, 1998

(30) Foreign Application Priority Data

Aug. 22, 1997 (JP) ..... 9-226253

(51) Int. Cl.
*G06F 15/00* (2006.01)
*G06F 13/00* (2006.01)

(52) U.S. Cl. ..... 715/810; 715/797; 715/716
(58) Field of Classification Search ..... 715/810, 715/797, 719, 723, 727, 716; 725/37, 38, 725/40
See application file for complete search history.

(56) References Cited

U.S. PATENT DOCUMENTS 4,422,105 A * 12/1983 Rodesch et al. ..... 386/83
5,404,316 A * 4/1995 Klingler et al. ..... 715/723
5,532,753 A 7/1996 Buchner et al.
5,831,616 A * 11/1998 Lee ..... 715/861
5,831,617 A * 11/1998 Bhukhanwala ..... 715/839
5,838,316 A * 11/1998 Arruza ..... 715/810
5,880,729 A * 3/1999 Johnston et al. ..... 715/823
5,966,121 A * 10/1999 Hubbell et al. ..... 715/726
5,966,122 A * 10/1999 Itoh ..... 715/838
5,990,972 A * 11/1999 Bond-Harris et al. ..... 348/563
6,141,004 A * 10/2000 Jeong ..... 715/723
6,215,952 B1 * 4/2001 Yoshio et al. ..... 386/94

FOREIGN PATENT DOCUMENTS

| | | |
|---|---|---|
| EP | 0 685 845 | * 12/1995 |
| EP | 0 737 980 | * 10/1996 |
| EP | 0 738 078 | * 10/1996 |
| EP | 0 788 094 | * 8/1997 |
| EP | 0 788 105 | * 8/1997 |
| JP | 09-44327 | 2/1997 |
| JP | 09-097155 | 4/1997 |
| WO | WO 97 02701 | 1/1997 |

OTHER PUBLICATIONS

Patent Abstracts of Japan, vol. 1998, No. 10, Aug. 31, 1998 & JP 10 145722, May 29, 1998.*

* cited by examiner

*Primary Examiner*—Cao (Kevin) Nguyen
(74) *Attorney, Agent, or Firm*—Frommer Lawrence & Haug LLP; William S. Frommer

(57) ABSTRACT

A recording medium retaining data for menu control, a menu control method and an apparatus are provided for creating a menu highly expressive and attractive to the viewer. When operation of a menu button is determined on a menu created with a moving picture with sound, the menu button turns into action highlighting and the color of the button changes into a highlight color. In order to emphasize action highlighting of the menu button, a specific short moving picture with a sound is automatically replayed. After the replay of the moving picture, the display jumps to a chapter of a title selected with the menu button and a replay is started.

84 Claims, 18 Drawing Sheets

RECORDING MEDIUM RETAINING DATA FOR MENU CONTROL, MENU CONTROL METHOD AND APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a recording medium retaining data for menu control, a menu control method and an apparatus, each provided for controlling operations in accordance with manipulation of menu buttons on a menu used for replaying information on the recording medium such as a digital video disk or digital versatile disk (DVD).

2. Description of the Related Art

A DVD and a DVD player have been practically utilized. A DVD is an optical disk for recording digitized video and audio data. Of replaying data on a DVD and recording data onto a DVD, a DVD player performs at least replaying data.

In the DVD format (standard), the format of still picture called subpicture that may be overlaid on a moving picture is defined besides normal moving pictures coded in Moving Picture Experts Group (MPEG) 2. A DVD implements a caption (subtitle) of a movie and a menu with such a subpicture.

In the DVD format, a specific programming language called navigation command is provided for controlling a replay method of a DVD player. Programming in navigation command implements, for example, an interactive program (software) and a replay started at a specific point called chapter such as the start of a highlight scene or a break in a story in a movie or a track on a compact disk (CD) that indicates a break between pieces of music.

An interactive program as mentioned above requires a user-operable picture for interactive questions and answers.

An interactive operation of a DVD player is usually implemented through indirect manipulation by the viewer selecting operation buttons displayed on a menu with cursor keys and so on of a remote controller, instead of direct interactive manipulation using operation buttons of the DVD player or the remote controller. As a result, various types of interactive software may be provided without being restricted by the buttons dedicated to the hardware of the DVD player.

Among menus for such interactive operations, basic ones common to any DVD are defined as DVD system menus. The DVD system menus are frames called up by a viewer through operation of the menu button of the remote controller of the DVD player for replaying a DVD in the DVD player. The format provides that the menu button is required to be added to the remote controller. The DVD system menus include operation buttons displayed on the screen. Various replay patterns are achieved by the viewer through selecting the operation buttons with a cursor key. The format provides that the cursor key is required to be added to the remote controller.

Various types of DVD system menus are defined in the DVD format. FIG. 1 shows an example of chapter menu which is one of the DVD system menus. The chapter menu is a menu including operation buttons arranged on the screen for allowing a direct jump to each chapter.

The chapter menu in FIG. 1 includes six chapter designation buttons 301, two menu selector buttons 302 and two menu page selector buttons 303. Three of the six chapter designation buttons 301 are vertically arranged on the left of the screen and the other three on the right. The two menu selector buttons 302 are arranged side by side below the chapter designation buttons 301.

For authoring such a menu, it is required to create pixel data corresponding to each operation button in accordance with the subpicture format of the DVD. In addition, it is necessary to perform programming in navigation command required for each operation button.

For replaying a DVD using the menu as shown in FIG. 1, the viewer selects the various buttons on the menu and specifies operations with the remote controller. The remote controller includes, for example, an up cursor key, a down cursor key, a left cursor key and a right cursor key for moving a selected operation button vertically and horizontally and a menu enter key for completing the operation of a selected operation button.

In general, a menu displayed on a monitor includes several operation buttons. The viewer presses the cursor keys of the remote controller and temporarily selects one of the operation buttons. The viewer further presses the menu enter key and completes the operation of the selected operation button. According to the DVD format, the color of the selected button is changed or the selected button is framed so as to indicate which button is selected on the screen. Such indication will be called highlighting in the following description. FIG. 2 shows an example of menu wherein one of the operation buttons is highlighted. As shown, the upper-left button 301a of the six chapter designation buttons 301 is highlighted.

Highlighting includes two types. One is select highlighting for indicating that the operation button in the menu is only temporarily selected. The other is action highlighting for indicating that the menu enter key is. pressed to be effective for about one second after the menu enter key is pressed until immediately before the operation is performed. In the example shown in FIG. 2, if the menu enter key is pressed when the upper-left button 301a is in the state of select highlighting, the highlight color turns into the action highlighting state for about one second. The display then directly jumps to the chapter of 'Scene 1: Introduction' where a replay is started.

However, indication with simple highlighting as described above, that is, a change of button color or framing only, is not effective enough for informing the viewer of button selection or execution. Such a user interface is not user-friendly. Furthermore, of sixteen colors that may be used for highlighting, up to four colors can be used at the same time. Such simple highlighting lacks expressivity. In terms of product, it is difficult to create a menu attracting the viewer with simple highlighting only.

SUMMARY OF THE INVENTION

It is an object of the invention to provide a recording medium retaining data for menu control, a menu control method and an apparatus so as to create a menu expressive and attractive to the viewer.

A recording medium retaining data for menu control of the invention is provided for implementing input of an instruction in response to an operation on a menu displayed on a screen. The data for menu control has a data structure including: menu display data for displaying the menu including at least one menu button for instructing to execute a predetermined function; response picture data for displaying a predetermined response picture in response to determination of an operation of the menu button; data for instructing to display the response picture using the response picture data when the operation of the menu button is determined on the menu displayed by using the menu display data; and data for instructing to execute the function assigned to the menu button after the response picture is displayed.

A menu control method of the invention is provided for implementing input of an instruction in response to an operation on a menu displayed on a screen. The method includes the steps of: displaying the menu including at least one menu button for instructing to execute a predetermined function; displaying a predetermined response picture when the operation of the menu button on the menu is determined; and executing the function assigned to the menu button after the response picture is displayed.

A menu control apparatus of the invention is provided for implementing input of an instruction in response to an operation on a menu displayed on a screen. The apparatus comprises: a menu display means for displaying the menu including at least one menu button for instructing to execute a predetermined function; a response picture display means for displaying a predetermined response picture when the operation of the menu button on the menu is determined; and a means for executing the function assigned to the menu button after the response picture is displayed by the response picture display means.

According to the recording medium retaining data for menu control of the invention, the menu including the menu button for instructing to execute a predetermined function is displayed by using the menu display data of the data for menu control. In response to determination of the operation of the menu button on the menu, display of the response picture is instructed by the data for instructing to display. The response picture is displayed by using the response picture data. After the response picture is displayed, the function assigned to the menu button is executed by using the data for instructing to execute.

According to the menu control method of the invention, the menu including the menu button for instructing to execute a predetermined function is displayed. When the operation of the menu button on the menu is determined, a predetermined response picture is displayed. After the response picture is displayed, the function assigned to the menu button is executed.

According to the menu control apparatus of the invention, the menu including the menu button for instructing to execute a predetermined function is displayed by the menu display means. When the operation of the menu button on the menu is determined, a predetermined response picture is displayed by the response picture display means. After the response picture is displayed, the function assigned to the menu button is executed by the means for executing.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings. An example will be described wherein a recording medium retaining data for menu control, a menu control method and a menu control apparatus of the embodiment are applied to a DVD and a DVD player. That is, the DVD corresponds to the recording medium of the embodiment. A method of controlling a menu used for replaying information recorded on the DVD in the DVD player corresponds to the menu control method of the embodiment. The DVD player corresponds to the menu control apparatus of the embodiment.

First, a subpicture required for displaying a menu of the DVD will be described. As previously described, in the DVD format, the format of still picture called subpicture that may be overlaid on a moving picture is defined besides normal moving pictures coded in MPEG2. Of the subpicture format of the DVD format, part relating to the embodiment of the invention will be extracted to be briefly described.

Figure 14:
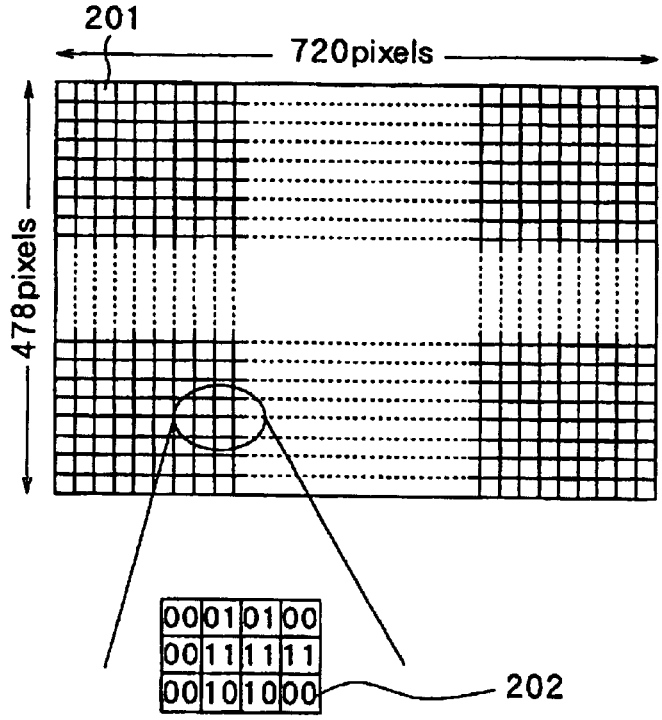
FIG. 14 is an explanatory view for illustrating a subpicture of a DVD.

As shown in FIG. 14, a subpicture of a DVD is defined as an aggregate of specific two-bit pixel data 202 allocated to each of pixels 201 of 720 wide by 478 high (as specified by NTSC video standards) into which a screen is divided. A specific color is assigned to each value represented by two-bit pixel data. The total of four colors are thus represented by pixel data. In practice, a combination of desired four colors is selected from a sixteen color palette to be used as the four colors each assigned to each pixel of the subpicture.

The percentage of subpicture overlaid on a moving picture is selectable. For example, if the percentage of subpicture is 0 percent and that of moving picture is 100 percent, the subpicture is transparent and invisible. If the percentages are both 50 percent, the subpicture is translucent. If the percentages are 100 percent and 0 percent, the background moving picture is completely hidden.

Tables are separately provided for each pixel data for specifying the correspondence of the selected four colors to the values represented by two-bit pixel data and the percentage of the subpicture overlaid over the background moving picture.

Figures 15A, 15B:
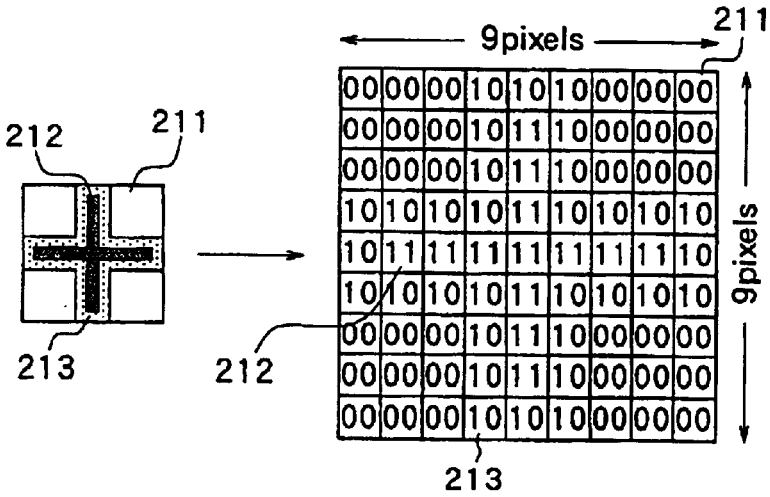
FIG. 15A and FIG. 15B are explanatory views for illustrating a subpicture of a DVD.

Referring to FIGS. 15A and 15B, representation of a 'bordered cross' in a subpicture of a DVD will be considered as an example. As shown in FIG. 15A, the number of colors required for representing the bordered cross is three including the colors of background 211, cross 212 and border 213. Next, the size of the cross is assumed to be 9 by 9 pixels. If pixel data "00" is assigned to the color of the background 211, pixel data '11' to the color of the cross 212 and pixel data '10' to the color of the border 213, an aggregate of 9×9 pixel data is defined as shown in FIG. 15B. The subpicture of one DVD is obtained through performing such an operation for all the pixels of 720 by 478.

With such a subpicture, if pixel data representing characters are arranged only near the lower side of all the region of the 720 by 478 pixels, the section above is all defined as the background 211 and the percentage of pixels of the background 211 to the moving picture is 0 percent, the subpicture wherein the characters are shown near the lower side and the other part is transparent is produced. The DVD implements captions of a movie and so on through the use of such a mechanism.

Menus of the DVD will now be described. As previously described, among menus for interactive operations, the basic ones common to any DVD are defined as the DVD system menus in the DVD format. The DVD system menus are frames called up by the viewer through operation of the menu button of the remote controller of the DVD player for replaying a DVD in the DVD player. The format provides that the menu button is required for the remote controller. Various replay patterns are designated by the viewer through selecting the operation buttons displayed on the screen with a cursor key required for the remote controller. The DVD format defines the following DVD system menus.

1. Title Menu

The title menu is used by the viewer for specifying which title (a piece of movie or animation) of audio and video data will be replayed when a plurality of titles are recorded on the DVD.

2. Chapter Menu

One title (usually called a piece of work such as one motion picture or one album of music video clips) of audio and video data has specific breaks or divisions (the turn of scenes of a movie or the break between video clips to which immediate access is intended by a producer of a record company). Such a break or a division is called chapter. The chapter menu has menu buttons for starting a replay immediately at each chapter.

3. Audio Menu

When a plurality of audio channels are provided for each title of video data recorded on the DVD (when video data of a movie includes audio data in the original language and audio data dubbed in a plurality of other languages, for example), the audio menu is provided for selecting a channel. The audio menu includes menu buttons arranged on the screen, indicating selectable languages and so on each provided for the respective audio channels.

4. Subtitle Menu

The subtitle is a movie and television broadcast term that means a caption. When a single or a plurality of types of subtitles are provided for a title recorded on the DVD, the subtitle menu is provided for selecting which subtitle to display of the plurality of types or for determining whether to display the subtitle or not. The subtitle menu includes menu buttons arranged on the screen, indicating selectable subtitles each provided for the respective subtitles.

5. Angle Menu

The angle is a function specific to the DVD format. For recording a football game, for instance, a plurality of cameras are usually used by which the game is shot simultaneously from different angles. That is, video data of the football game includes images of the entire game taken by a long-shot camera, close-up images taken by a camera following the offense and close-up images taken by a camera following the defense. The angle function of the DVD allows the viewer to select video data shot from a specific angle to replay when a plurality of types of video data obtained through shooting the object simultaneously from different angles are multiplexed to be recorded on the DVD and replayed in the DVD player. The angle menu includes menu buttons arranged on the screen, indicating selectable angles and so on each provided for the respective angles.

6. Root Menu

The total of five types of menus defined in the DVD format are described so far. However, it is not always the case that the remote controller of the DVD player includes five buttons for displaying the five types of menus. The DVD format provides that the two buttons are only required for calling up the title menu and another menu. Therefore, if the title to replay requires one or more of the chapter menu, the audio menu, the subtitle menu and the angle menu, a specific menu is required for calling up the menus. The root menu includes one menu button or more arranged on the screen indicating one or more of the chapter menu, the audio menu, the subtitle menu and the angle menu.

For authoring such menus, it is required to create pixel data corresponding to each menu button in accordance with the subpicture format of the DVD. In addition, it is necessary to perform programming in navigation command required for each menu button. As previously described, the navigation command is a specific language provided in the DVD format for controlling a replay method of a DVD player. The program written in navigation command is recorded on the DVD together with video and audio data. The DVD player replays the video and audio data in accordance with the program written in navigation command.

Figure 7:
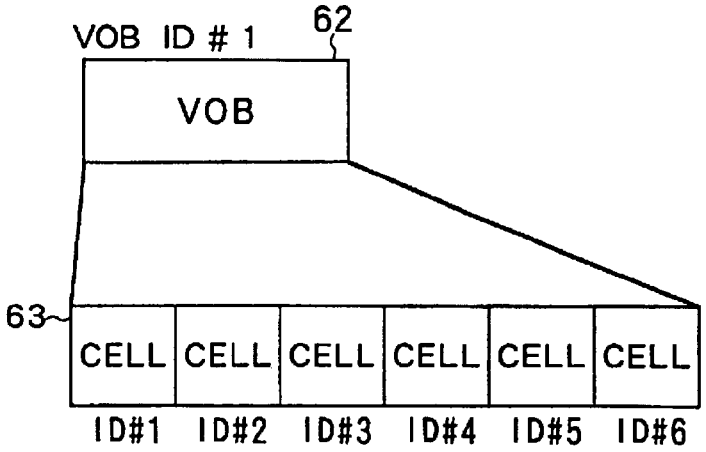
FIG. 7 illustrates the data structure of VOB of a DVD.

Reference is now made to FIG. 7 to describe a data structure for making up the menus and so on as described above. Multiplexed video and audio data as a content of a DVD is called video object (VOB). A VOD is made up of a meaningful series of multiplexed video and audio data and defined as multiplexed data making a great sense in allowing access for a continuous replay such as a title of movie, the audio menu or the chapter menu.

Accordingly, a single DVD usually includes a plurality of blocks called VOBs. As shown in FIG. 7, each VOB 62 has a serial VOB identification number (VOB ID number) (ID #1 in FIG. 7). The VOB 62 is further divided into units called cells 63. The cells 63 each have a cell identification number (cell ID number) in ascending order (ID #1 to ID #6 in FIG. 7). The VOB 62 is not mechanically divided into the cells 63 but the cells 63 are each defined as a meaningful block as in defining the VOB. For example, the cells correspond to divisions of chapters of a movie title or to pages to be displayed of a menu with a plurality of pages.

Figure 8:
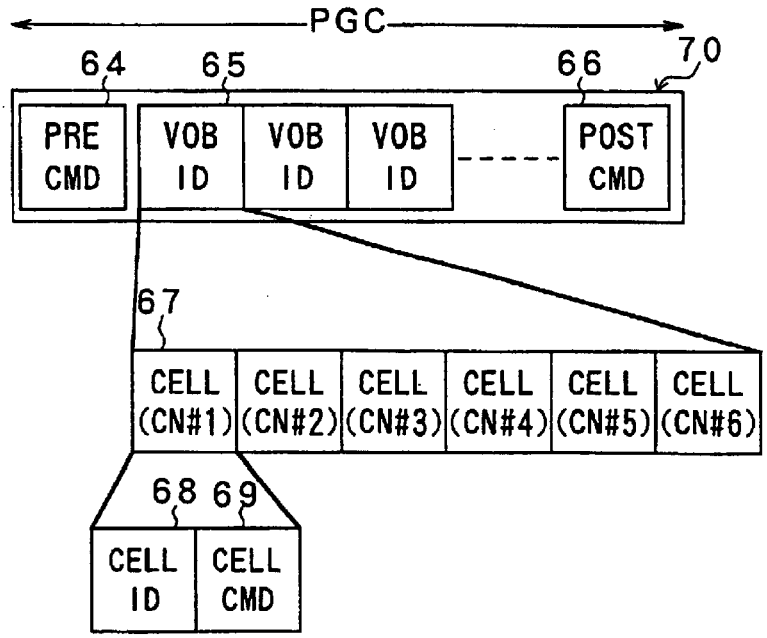
FIG. 8 illustrates the data structure of PGC of the DVD.

According to the DVD format, a unit in which a menu or a title is replayed is represented by replay control data called program chain (PGC). As shown in FIG. 8, a PGC 70 is made up of a pre-command (PRE CMD) 64, a VOB identifier (VOB ID) 65 and a post-command (POST CMD) 66. The VOB ID 65 is made up of a combination of the VOB ID number described above and the initial address on the disk where the corresponding VOB is recorded. A plurality of VOB IDs 65 may be provided in sequence.

The VOB ID 65 is further made up of a series of cell information sections 67. As the VOB ID 65, each cell information section 67 is composed of a cell identifier (cell ID) 68 made up of a combination of cell ID number (of cell numbers CN #1 to CN #6 in FIG. 8) and the initial address on the disk where the corresponding cell is recorded; and a cell command (cell CMD) 69 executed at the point of completion of replay of the cell. The cell CMD 69 is used for specific purposes only as the present invention and may be omitted. The cell CMD 69 is not usually used in an ordinary movie or a still-frame menu.

The DVD player traces the information presented by the VOB ID 65 and the cell ID 68 in the order of appearance so as to determine the address where the content of multiplexed data to be replayed is recorded and practically performs replay. For convenience, this operation is called a replay of PGC. The PRE CMD 64 is a navigation command executed before the replay of PGC. The POST CMD 66 is a navigation command executed after the replay of PGC. The navigation commands will be described later on.

As thus described, a replay of a DVD is made up of a combination of the PGC 70 with the corresponding actual multiplexed data (VOB 62) and the VOB ID 65 and the cell ID 68 affixed to the VOB 62. The replay is controlled by the navigation commands including the PRE CMD 64, the POST CMD 66 and the cell CMD 69. Although more other items of data are required for the replay of the DVD, description thereof not relating to the present invention is omitted.

The navigation commands will now be described. According to the DVD format, a program written in navigation command is recorded on a DVD together with video and audio data. A DVD player replays the video and audio data in accordance with the program written in navigation command. For example, a plurality of audio channels may be multiplexed to be recorded on a DVD and the program written in navigation command may be used for designating which of the plurality of channels to be selected and for directly jumping to a chapter for starting a replay. A program written in navigation command may be used for much complicated operations besides these simple examples.

For example, a program written in navigation command achieves an interactive work wherein a still picture (subpicture) for asking the viewer a question appears at the completion of the replay of a chapter and a destination chapter at which replay is started is determined in accordance with the answer of the viewer to the question. This example is a method used in a piece of work called multistory/multiending (a work with game elements wherein a choice between A and B and so on is provided a each break between scenes and the next scene is determined depending on the choice). Through the use of the navigation command, high interactivity is achieved such as repeating a replay of a particular cell or switching a cell to replay in accordance with the selection of the viewer using the DVD menu.

Figure 9:
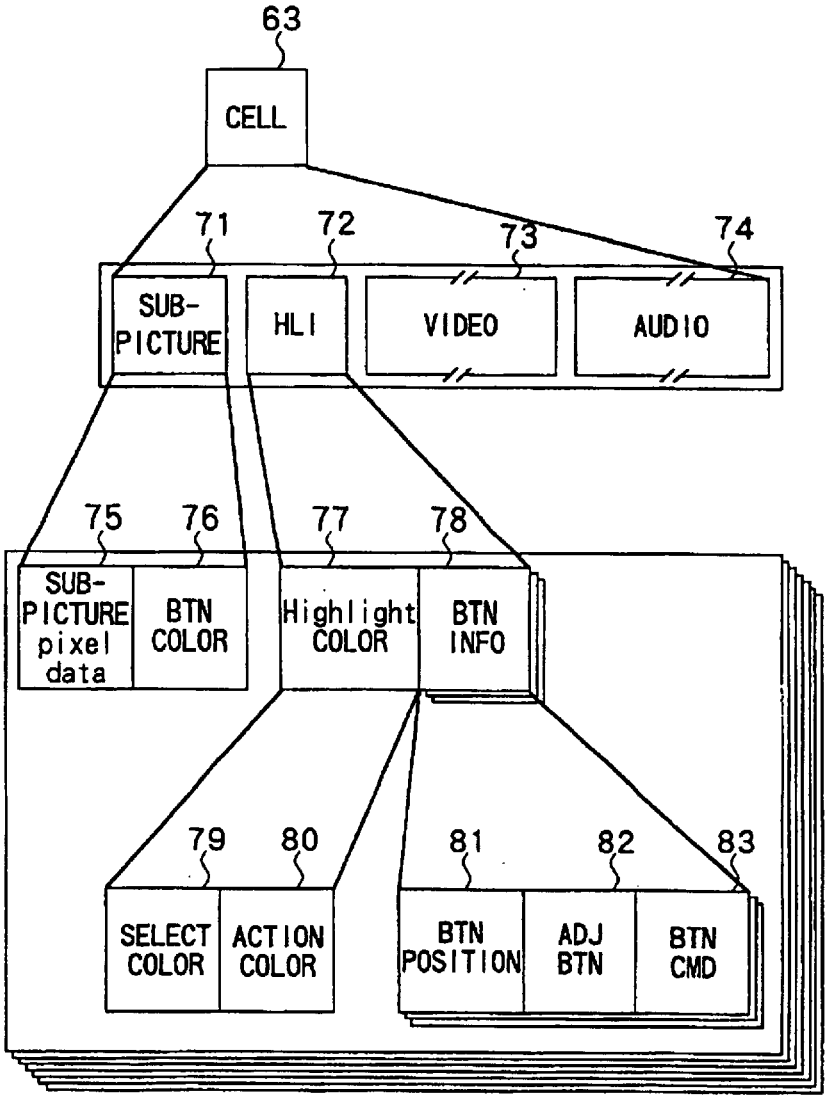
FIG. 9 illustrates the data structure of cell of the DVD.

FIG. 9 shows a data structure of the cell 63 in the multiplexed VOB 62 for implementing a menu. Although the data structure for implementing the menu is determined by the entire PGC, the structure for implementing menu buttons will be only described.

For example, if the menu includes a plurality of pages, each menu page is made of the single cell 63. The cells 63 corresponding to the number of the pages form the VOB 62 shown in FIG. 7 altogether. As shown in FIG. 9, the cell 63 is composed of the following elements.

1. Cell

The single cell 63 includes all the display data corresponding to one page of menu and control data of the menu button. The cell 63 includes a subpicture 71, a display image of the menu button, as the display data. The cell 63 further includes a highlight information data (shown as HLI) 72 as control data of the menu button. In the embodiment of the invention, in particular, video data (shown as VIDEO) 73 for a background of the menu is multiplexed in the cell 63. Furthermore, if the menu is a (moving or still) picture with audio, audio data (shown as AUDIO) 74 is multiplexed in the cell 63. If the video data is of a still-frame image, the menu is a still-frame menu. If the video data is of a moving image, the menu is a moving picture menu.

2. Subpicture

The subpicture 71 is a region where pixel data and color information for displaying the menu are stored. The subpicture 71 includes a subpicture pixel data 75 and button color data (shown as BTN COLOR) 76 to be described later on.

3. Highlight Information Data (HLI)

Highlight information data 72 is a region where information relating to selection of the menu buttons on the menu is stored. The highlight information data 72 includes highlight color data 77 and button information data (shown as BTN INFO) 78. The highlight color data 77 includes color information for changing (highlighting) the color of one of the menu buttons being selected on the menu for indicating the selection and color information for changing the color of the menu button when the function assigned to the selected button is executed. The button information data 78 includes: relative positions of the menu buttons on the menu; adjacent information among the menu buttons that is required for indicating the menu button to be selected next when the selected menu button on the menu is vertically and horizontally shifted with the cursor key of the remote controller of the DVD player; and the navigation command provided for the menu button, used when the operation of the menu button is determined.

4. Subpicture Pixel Data

Pixel data for displaying the menu buttons is stored in subpicture pixel data 75. If the menu includes a plurality of pages, the pixel data is provided for the corresponding pages.

5. Button Color Data

The button color data 76 retains color information of pixel data of the subpicture for displaying the menu when not selected (not highlighted) and data indicating a color palette as a reference for color information when the menu button is highlighted.

6. Highlight Color Data

The highlight color data 77 retains color information for highlighting the menu buttons on the menu. The color information includes select color data 79 indicating the highlight color when the menu button is selected and action color data 80 indicating the highlight color of the menu button when the function assigned to the selected menu button is executed. Each of the color data 79 and 80 is a pointer to the data indicating the color palette in the button color data 76 and does not retain actual color data.

7. Button Information Data

The button information data 78 includes: button position data (shown as BTN POSITION) 81 for indicating relative positions of the menu buttons on the menu; adjacent button data (shown as ADJ BTN) 82 for indicating the adjacent menu buttons that is required for indicating the menu button to be selected next when the selected menu button on the menu is vertically and horizontally shifted with the cursor key of the remote controller of the DVD player; and a button command (shown as BTN CMD) 83 made up of the navigation command for executing the function assigned to the menu button. The button information data 78 plays a key role as a section for describing functional logics of the menu buttons on the menu.

8. Select Color Data

The select color data 79 retains a pointer to the color palette of the highlight color when the menu button is selected.

9. Action Color Data

The action color data 80 retains a pointer to the color palette of the highlight color of the menu button when the function assigned to the menu button is executed.

10. Button Position Data

The button position data 81 indicates the relative positions of the menu buttons on the menu with coordinates of the pixels. To be specific, since the logical display region of each menu button is defined as a rectangle, the button position data 81 includes the coordinates of the top-left corner and the bottom-right corner of the region. The button position data 81 further includes a pointer to the color palette of color information when the menu button is not selected. On the single menu, the color indicating that the button is not selected is defined as one regardless of the number of the menu buttons. The button position data 81 further includes an auto-action flag as auto-action information indicating whether to automatically perform the function assigned to each menu button when the menu button is selected.

11. Adjacent Button Data

The adjacent button data 82 retains adjacent information among the menu buttons that is required for indicating the menu button to be selected next when the selected menu button on the menu is vertically and horizontally shifted with the cursor key of the remote controller of the DVD player.

12. Button Command

The button command 83 is the navigation command for executing the functions assigned to the menu buttons and directly defines the functions.

Figure 10:
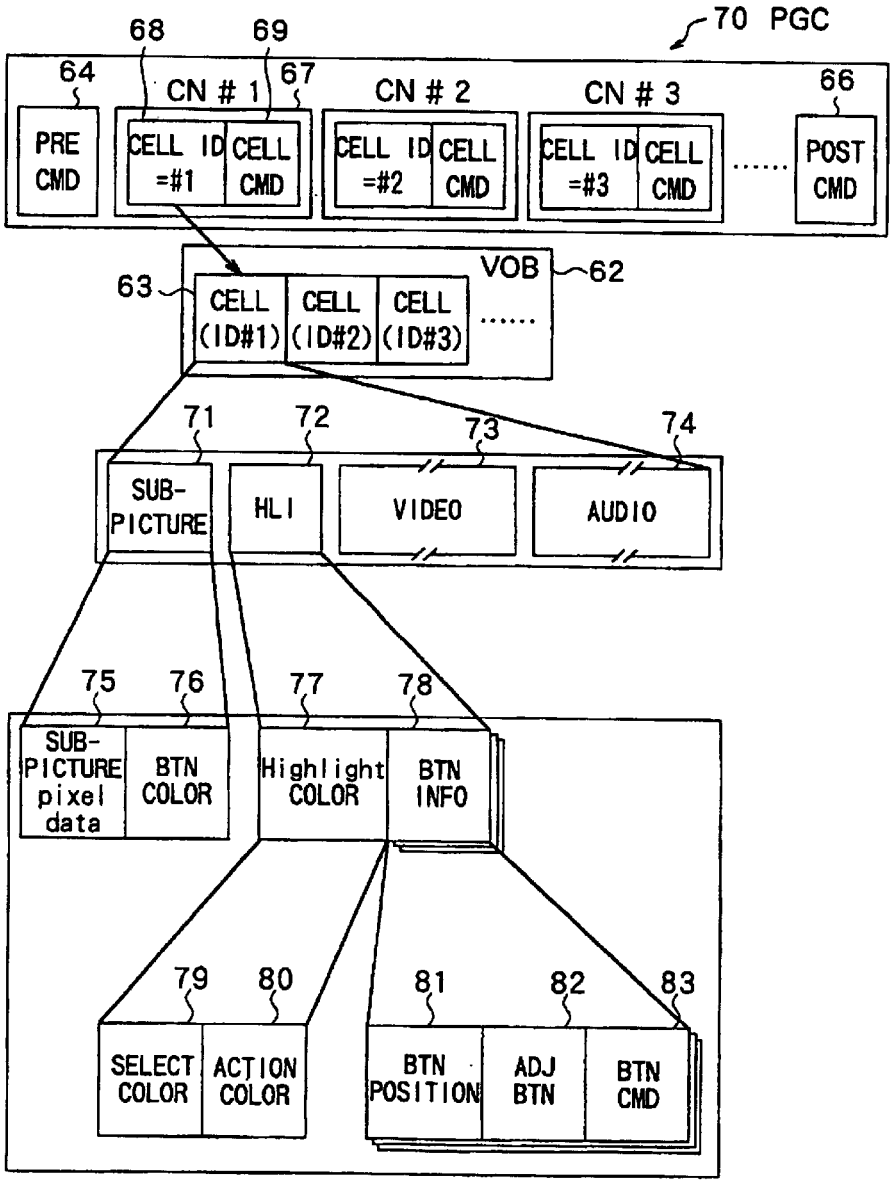
FIG. 10 shows the relationship between the structures of PGC and VOB of the DVD.
Figure 11:
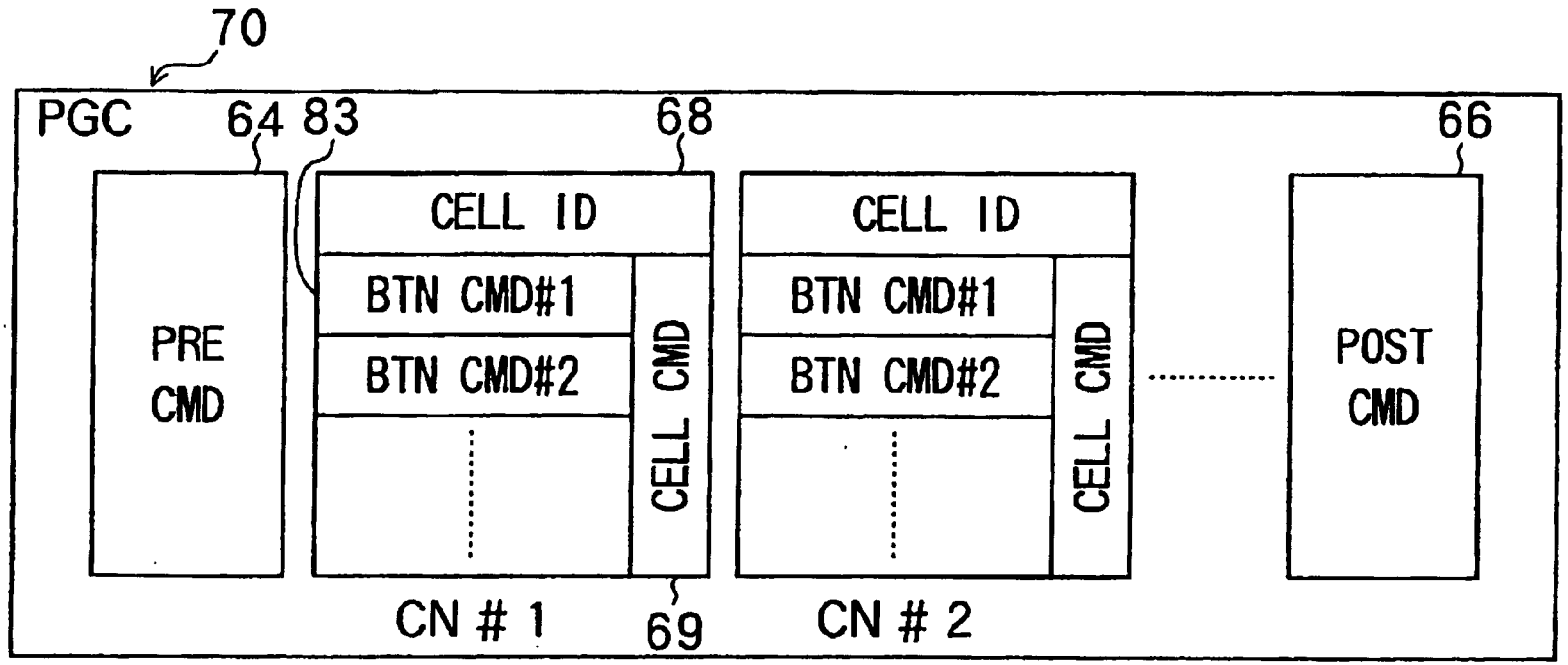
FIG. 11 is a schematic view of the structure of PGC in FIG. 10.

Reference is now made to FIG. 10 illustrating the data structure of the VOB, the PGC and the menu described so far. As shown, the PGC 70 corresponding to data for menu control of the invention includes the cell information sections 67 of the cell numbers CN#1, #2, #3 and soon. In FIG. 10, the cell ID numbers of the cell numbers CN #1, #2, #3 and so on are #1, #2, #3 and so on, respectively. The cell 63 of the VOB 62 represented by the cell information section 67 includes display data of the menu (video data as a background of the menu, audio data and subpicture data) and highlight information data (HLI) as control data of the menu buttons. FIG. 10 shows the data for menu display included in the cell 63 of cell ID #1. In order to display a single menu, such a complicated hierarchical data structure is required. However, if attention is focused on the navigation command for controlling the mechanism of the menu and a replay of a title, the items relating to menu display are the PRE CMD 64, the cell CMD 69, the POST CMD 66 and the BTN CMD 83. Accordingly, for convenience, the structure of the PGC 70 is only represented by the cell ID 68 indicating correspondence to the cell 63 in addition to the navigation commands as shown in FIG. 11. The BTN CMDs #1, #2 and so on in FIG. 11 indicate that the number of BTN CMDs in the corresponding menu page is equal to the number of the menu buttons. Although the BTN CMD 83 is included in the cell 63 in the strict sense, the BTN CMD 83 is included in the PGC 70 for convenience in FIG. 11.

Figure 1:
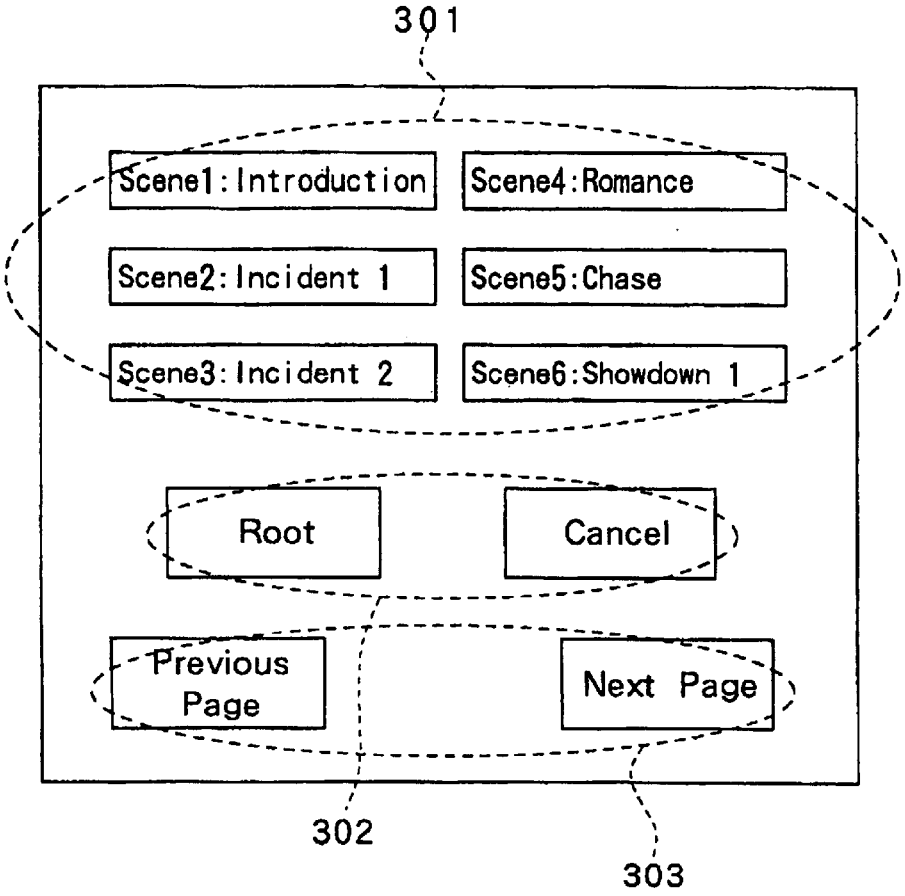
FIG.1 RELATED ART
FIG. 1 shows an example of chapter menu of a DVD player of related art.
Figure 2:
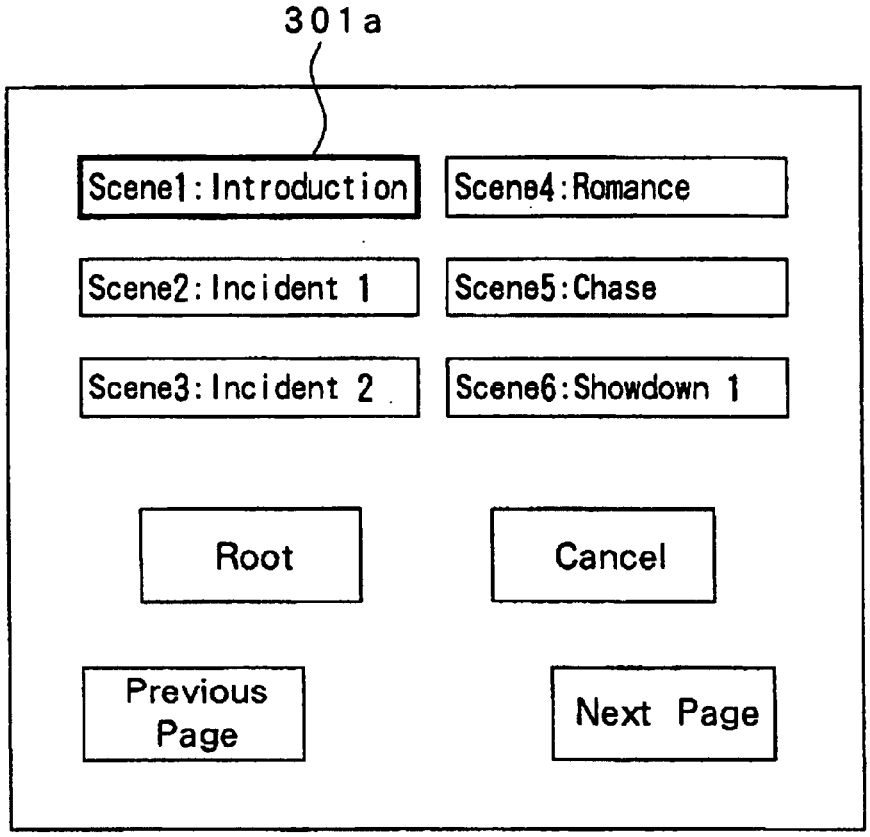
FIG.2 RELATED ART
FIG. 2 shows an example of related-art menu wherein a menu button is highlighted.
Figure 3:
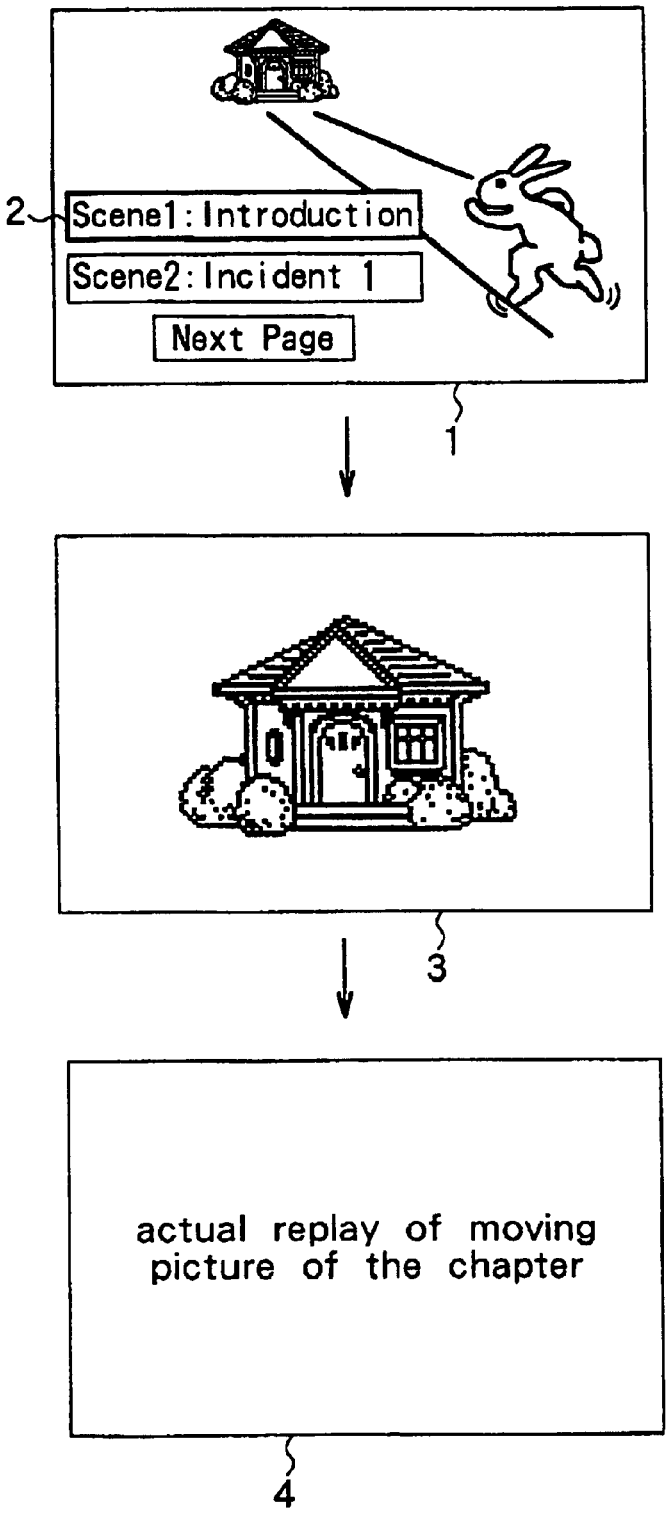
FIG. 3 illustrates the outline of operation of a first embodiment of the invention from a menu to a replay of moving picture of a chapter.

Referring to a specific example shown in FIG. 3, the outline of the embodiment of the invention will now be described. The menu in this example is a chapter menu. FIG. 3 shows the example from the menu to a replay of a title. The menu may be a normal still picture or preferably a moving picture with audio. The moving picture with audio is programmed to be automatically replayed repeatedly. In a menu 1 shown in FIG. 3, for example, a rabbit running towards a house is repeatedly replayed with sound. Menu buttons are made up of a still picture of subpicture and synthesized into one picture with the moving picture as a background with audio when the menu is replayed in a DVD player. In the 'moving picture as a background with audio', the moving picture is the picture of the rabbit running towards the house mentioned above, for example. The audio is a message such as 'Choose whichever you like.', for example.

On the menu 1 in FIG. 3, the viewer operates the cursor keys of the remote controller and select a menu button so as to decide a chapter to replay in a manner similar to the operation of the related-art menu. Once execution of the menu button is determined, the menu button turns into action highlighting and the highlight color of the button changes as in the related-art menu. The related-art menu then shifts to a replay of a chapter. In the embodiment of the invention, after execution of the menu button is determined, in order to emphasize action highlighting of the menu button, a specific short moving picture with sound indicating the state of action highlighting is automatically replayed after the menu button has turned into action highlighting and the highlight color of the button has changed. The display then jumps to the chapter of the title selected with the menu button and a replay is started. This series of operations is called 'dynamic highlighting' for convenience. The moving picture with a sound indicating the state of action highlighting is called 'dynamic highlight picture'. In the example shown in FIG. 3, 'Scene 1: Introduction' of a menu button 2 is selected and the button 2 turns into action highlighting. A moving picture showing the rabbit opening a door and entering the house and a close-up of the house are then automatically displayed as a dynamic highlight picture 3 with a specific sound. After the dynamic highlight picture 3 is displayed, a moving picture of the chapter designated with 'Scene 1: Introduction' of the menu button 2 is replayed in a title replay screen 4. The specific sound may be sound effects suggesting zooming in, sound effects of opening the door or a message relating to the chapter to replay.

Figure 4:
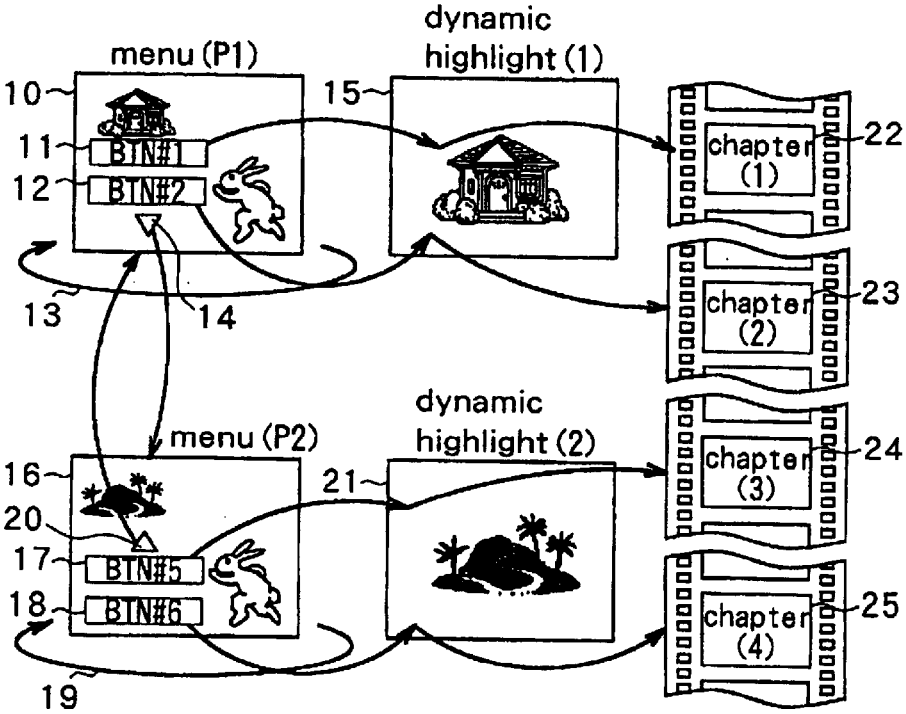
FIG. 4 illustrates the operation of the first embodiment of the invention from a menu consisting of a plurality of pages to a replay of moving picture of a chapter.

The action of the menu implemented by the moving picture with a sound and action of the pages will now be described. FIG. 4 shows a menu made up of two pages implemented by moving pictures with a sound, dynamic highlight pictures and chapters replayed in accordance with a menu button (BTN) selected on the menu.

A menu (P1) of a first page includes: a BTN (#1) 11 for instructing a replay of a chapter (1); a BTN (#2) 12 for instructing a replay of a chapter (2); and a BTN (#3) 14 in the shape of arrow pointing downward for instructing switching to the next menu page. A menu (P2) of a second page includes: a BTN (#5) 17 for instructing a replay of a chapter (3); a BTN (#6) 18 for instructing a replay of a chapter (4); and a BTN (#4) 20 in the shape of arrow pointing upward for instructing switching to the previous menu page. First, the menu (P1) of the first page performs a repeat replay in which a moving picture with a sound as a menu picture 10 is replayed and the display automatically returns to the start of the picture after the picture is replayed to the end thereof (arrow 13). As the menu (P1), the menu (P2) of the second page performs a repeat replay in which a moving picture with a sound as a menu picture 16 is replayed and the display automatically returns to the start of the picture after the picture is replayed to the end thereof (arrow 19). The replay of the menu picture 10 of the first page is interrupted immediately after the BTN (#3) 14 is selected and executed. A replay is then started at the start of the menu picture 16 of the second page.

Conversely, the replay of the menu picture 16 of the second page is interrupted immediately after the BTN (#4) 20 is selected and executed. A replay is then started at the start of the menu picture 10 of the first page.

The dynamic highlight operation will now be described. A repeat replay of the menu picture 10 of the first page is assumed to be being performed. If the BTN (#1) 11 is selected and executed, the replay of the menu picture 10 is immediately interrupted and a dynamic highlight picture (1) 15 is automatically replayed. On completion of the replay, the display jumps to the chapter (1) 22 in the title and a replay is started, which is the original function of the BTN (#1) 11. If the BTN (#2) 12 is selected and executed, as the BTN (#1) 11, the replay of the menu picture 10 is immediately interrupted and the dynamic highlight picture (1) 15 is automatically replayed. On completion of the replay, the display jumps to the chapter (2) 23 in the title and a replay is started, which is the original function of the BTN (#2) 12.

While a repeat replay of the menu picture 16 of the second page is performed, if the BTN (#5) 17 is selected and executed, a dynamic highlight picture (2) 21 is replayed and then the display jumps to a chapter (3) 24. If the BTN (#6) 18 is selected and executed, as the BTN (#5) 17, the dynamic highlight picture (2) 21 is replayed and then the display jumps to a chapter (4) 25 and a replay is started. Such a dynamic highlight operation is implemented by the structure of PGC as data for menu control and programming of navigation commands.

The structure of PGC and programming of navigation commands for implementing the operation described above in the embodiment will now be described. Although the menu structure requires information including the subpicture pixel data 75, the button color data 76, the select color data 79, the action color data 80, the button position data 81 and the adjacent button data 82, as shown in FIG. 9, such information does not directly relate to the present invention and detailed description thereof is omitted. Programming not contradicting the description of the invention is assumed to be made in the embodiment. For example, the programming includes: colors that are not transparent are designated for the button color data 76; the initially highlighted menu button is the BTN (#1) 11 or the BTN (#5) 17; and the adjacent button data 82 includes the vertical relationship only.

The structures of VOB and PGC as the data structure will now be described wherein the menu shown in FIG. 4 is implemented as the chapter menu of the DVD system menus.

Figure 5:
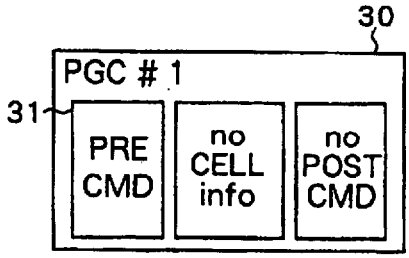
FIG. 5 illustrates the PGC structure of a root menu of the first embodiment of the invention.

As previously described, if the DVD system menu includes any of the chapter menu, the audio menu, the subtitle menu and the angle menu, the DVD system menu requires the root menu that is a specific menu for calling up the menu. Accordingly, a PGC for the root menu which is the logical structure of the root menu is required. FIG. 5 shows the structure of a PGC (PGC #1) 30 for the root menu. The PGC 30 for the root menu does not have any menu page to display as the root menu so that the PGC 30 does not have any corresponding VOB and cell and the PGC 30 is a special form of PGC consisting only of the PRE CMD 31 of the navigation commands. In the DVD format such a PGC is called dummy PGC.

Figure 6:
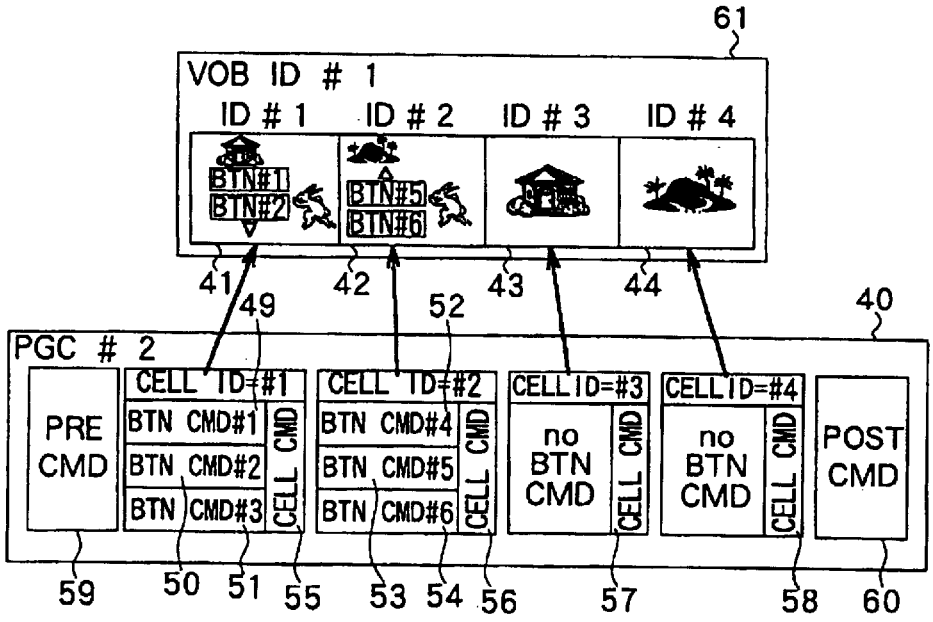
FIG. 6 illustrates the data structure for organizing the menu shown in FIG. 4.

FIG. 6 shows the structures of VOB and PGC of the menu shown in FIG. 4. Video signals as the background, audio signals and subpicture signals for the menu buttons, which are actually replayed as the chapter menu and the dynamic highlight picture, are multiplied as a series of data in a VOB (VOB ID #1) 61. The VOB 61 includes four cells 41 to 44 with cell numbers CN #1 to CN #4. In FIG. 6, cell ID numbers of the cells 41 to 44 with cell numbers CN #1 to CN #4 are #1 to #4, respectively. Data of the menu 10 of the first page in FIG. 4 as data for menu display is recorded in the cell 41 with cell ID #1. As the menu 10, data of the menu 16 of the second page is recorded in the cell 42 with cell ID #2. Data of the dynamic highlight picture (1) 15 as data for response picture display is recorded in the cell 43 with cell ID #3. Data of the dynamic highlight picture (2) 21 is recorded in the cell 44 with cell ID #4.

As thus described, authoring of the DVD is easily achieved by recording the data for menu display and data for the dynamic highlight picture in series. That is, no particular attention is required for making a master tape. For producing such a specific kind of menu, the user may provide a master tape wherein necessary moving pictures and sounds are linked to each other. The user may specify with time codes where the breaks between the menu pages and the divisions of the dynamic highlight sections are located on the master tape. The menu is thus easily produced. Furthermore, since data of the menu and the dynamic highlight picture is provided in series, coding and multiplexing of the DVD is completed in a single step, which is more efficient than individual operations.

While the VOB 61 has the structure as described above, the PGC 40 is organized as follows. A PGC (PGC #2) for one chapter menu is allocated to the series of VOB 61. The PGC 40 includes information relating to the four cells 41 to 44. In order to specify a correspondence between the information and the cells 41 to 44 in the VOB 61, the information is defined as follows. Cell ID number of the cell 41 of cell number CN #1 in the VOB 61 is set to #1. Cell ID number of the cell 42 of cell number CN #2 is set to #2. Cell ID number of the cell 43 of cell number CN #3 is set to #3. Cell ID number of the cell 44 of cell number CN #4 is set to #4.

The cells 41 and 42 whose cell ID numbers are #1 and #2, respectively, correspond to the menu 10 of the first page and the menu 16 of the second page in FIG. 4, respectively. The menus 10 and 16 each include the three menu buttons. Therefore, three BTN CMD (#1 to #3) 49 to 51 are provided as BTN CMD of data for instructing display of the response picture and data for instructing execution of the function in the cell 41. Three BTN CMD (#4 to #6) 52 to 54 are provided as BTN CMD in the cell 42. The cells 43 and 44 whose cell ID numbers are #3 and #4, respectively, correspond to the dynamic highlight picture (1) 15 and the dynamic highlight picture(2) 21, respectively. Since the dynamic highlight pictures (1) 15 and (2) 21 do not have any menu button, no BTN CMD is provided for the cells 43 and 44. The PGC 40 includes cell CMD 55 to 58 for controlling replay operations, corresponding to the four cells 41 to 44, respectively. The PGC 40 further includes a PRE CMD 59 and a POST CMD 60.

The single PGC 40 for the chapter menu is provided in the embodiment since the series of VOB 61 for the chapter menu is provided as one. However, the more important reason is the merit as follows. Various kinds of data written in the PGC 40 are recorded on the disk together as a PGC information table. If a plurality of PGCs are provided, the PGC information table is divided as well to be recorded on the disk. Therefore, by providing the single PGC 40 and recording the PGC information table in one region on the disk, the PGC 40 is completely read by accessing once. A replay with excellent response is thereby achieved. In contrast, if the PGC is divided into the menu section and the dynamic highlight section, the DVD player is required to access the PGC information table of the dynamic highlight section while the DVD player shifts from a replay of the menu section to a replay of the dynamic highlight section. The response of replay is thereby decreased.

The contents of the navigation commands will now be described for implementing the menu shown in FIG. 4 as the chapter menu of the DVD system menus. The contents of the navigation commands called PRE CMD, POST CMD, cell CMD and BTN CMD written in the PGC described above that are the features of the embodiment will be described. For description of the navigation commands, the DVD format prescribes that the cell CMD and the BTN CMD are each written on one line. Although a combination of a plurality of cells is called program (PG), a PG consisting of a single cell may be implemented without any substantial problem. For brevity, a PG consisting of a single cell is thus provided in the embodiment of the invention. Furthermore, some navigation commands are required to be described with a PG number instead of a cell number and a PG number and a cell number should be distinguished from each other in the strict sense. However, since a PG consisting of a single cell is provided in the embodiment, what a cell number and a PG number specify is identical.

For the cell, it is required that information such as a seamless flag, a cell type, a block type and a still time should be written in the PGC information table. Since such information does not directly relate to the invention, description thereof is omitted. In the embodiment the information is determined so that it does not contradict the structures of PGC and cell. The still time may be any desired value other than the infinite. The still time is 0 second in the embodiment.

As shown in FIG. 5, the PRE CMD 31 is only written in the PGC 30 for the root menu without any menu page to display. The content of the PRE CMD 31 is an instruction of shift to the chapter menu.

As shown in FIG. 6, the PGC 40 for the chapter menus includes: the PRE CMD 59, the BTN CMD 49 to 54 for the receptive menu buttons; the cell CMD 55 to 58 for the respective cells; and the POST CMD 60.

There is no instruction corresponding to the PRE CMD 59. Therefore, after the operation shifts to the chapter menu, the operation shifts to the cell 41 of cell ID #1.

The contents of the BTN CMD (#1 to #3) 49 to 51 in the cell 41 of cell ID #1 are as follows.

The content of the BTN CMD (#1) 49 is an instruction to enter '1' as the final destination chapter number for parameter 1 and to shift to the cell 43 of cell number CN #3. For parameter 1, data for specifying the function assigned to the menu button is entered, that is, data for specifying the final destination is entered in the embodiment. The data corresponds to data for specifying the function of the invention.

The content of the BTN CMD (#2) 50 is an instruction to enter '2' as the final destination chapter number for parameter 1 and to shift to the cell 43 of cell number CN #3.

The content of the BTN CMD (#3) 51 is an instruction to shift to the next menu page, that is, the cell 42 of cell number CN #2 corresponding to the menu 16 of the second page.

The content of the CELL CMD 55 corresponding to the cell 41 is an instruction to shift to the start of its own cell.

The contents of the BTN CMD (#4 to #6) 52 to 54 in the cell 42 of cell ID #2 are as follows.

The content of the BTN CMD (#4) 52 is an instruction to shift to the previous menu page, that is, the cell 41 of cell number CN #1 corresponding to the menu 10 of the first page.

The content of the BTN CMD (#5) 53 is an instruction to enter '3' as the final destination chapter number for parameter 1 and to shift to the cell 44 of cell number CN #4.

The content of the BTN CMD (#6) 54 is an instruction to enter '4' as the final destination chapter number for parameter 1 and to shift to the cell 44 of cell number CN #4.

The content of the cell CMD 56 corresponding to the cell 42 is an instruction to shift to the start of its own cell.

The contents of the cell CMD 57 corresponding to the cell 43 of cell ID #3 and the cell CMD 58 corresponding to the cell 44 of cell ID #4 are instructions to shift to the end of the PGC 40 and to execute the POST CMD 60.

The content of the POST CMD 60 is an instruction to shift to the chapter of the number written in parameter 1. That is, if '1' is entered for parameter 1, the instruction is to shift to chapter (1). If '2' is entered for parameter 1, the instruction is to shift to chapter (2). If '3' is entered for parameter 1, the instruction is to shift to chapter (3). If '4' is entered for parameter 1, the instruction is to shift to chapter (4).

The navigation commands described so far implement control of the replay operation described with reference to FIG. 4.

Figure 12:
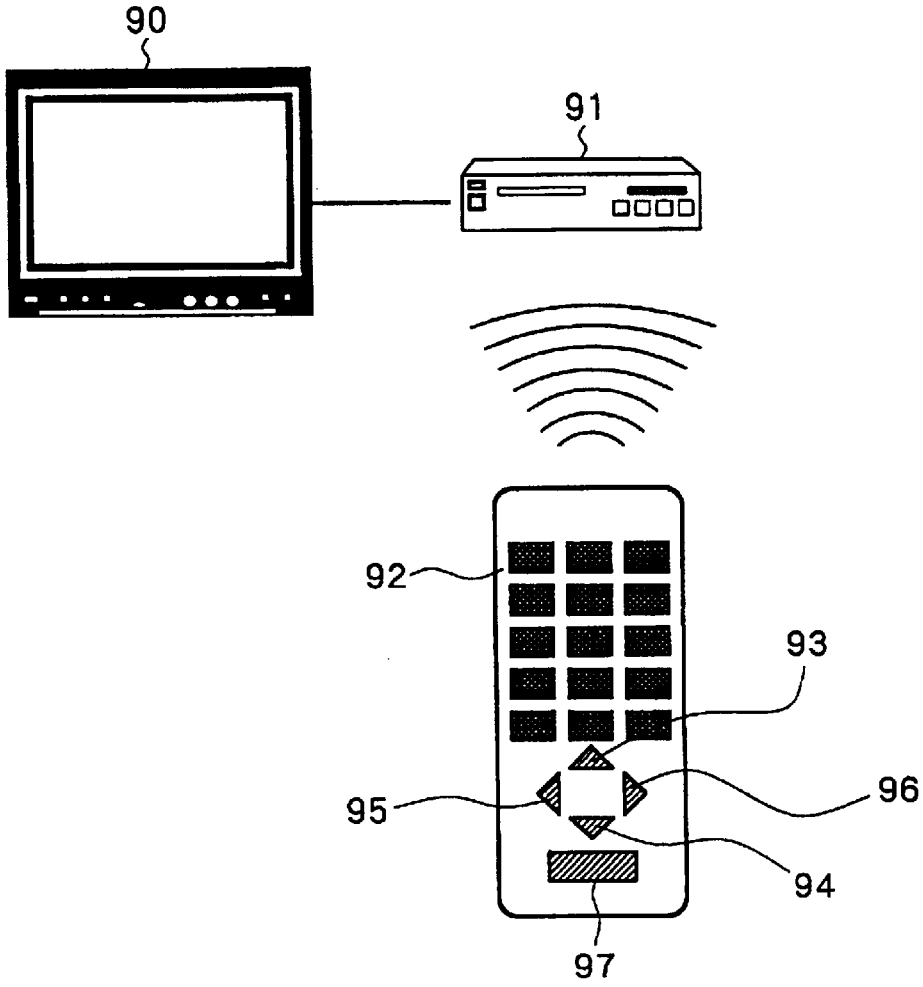
FIG. 12 illustrates a DVD player and its peripherals.

Reference is now made to FIG. 12 for describing operations using the menu of the embodiment as shown in FIG. 3, for example. FIG. 12 illustrates a DVD player and its peripherals. FIG. 12 shows: the DVD player 91; a monitor 90 for displaying pictures replayed by the DVD player 91; and a remote controller 92 for operating the DVD player 91. The remote controller includes: an up cursor key 93, a down cursor key 94, a left cursor key 95 and a right cursor key 96 for shifting a selected operation button vertically and horizontally and a menu enter key 97 for completing the operation of a selected operation button.

In order to replay the DVD including the PGC as previously described, the viewer first manipulates operation buttons and so on (not shown) of the remote controller 92 so as to display a desired menu on the monitor 90. If the menu 1 shown in FIG. 3 is displayed on the monitor 90, for example, one of the menu buttons 2 at the top is highlighted at first. In this state, the viewer may select any of the menu buttons 2 by pressing the up cursor key 93 or the down cursor key 94 of the remote controller 92. If the viewer presses the menu enter key 97 while the button for specifying a chapter among the menu buttons 2 is selected (highlighted), the dynamic highlight picture 3 is displayed and a replay is started at the designated chapter.

If the viewer presses the menu enter key 97 while the menu page switching button among the menu button 2 is selected (highlighted), the menu page is switched to another.

Figure 13:
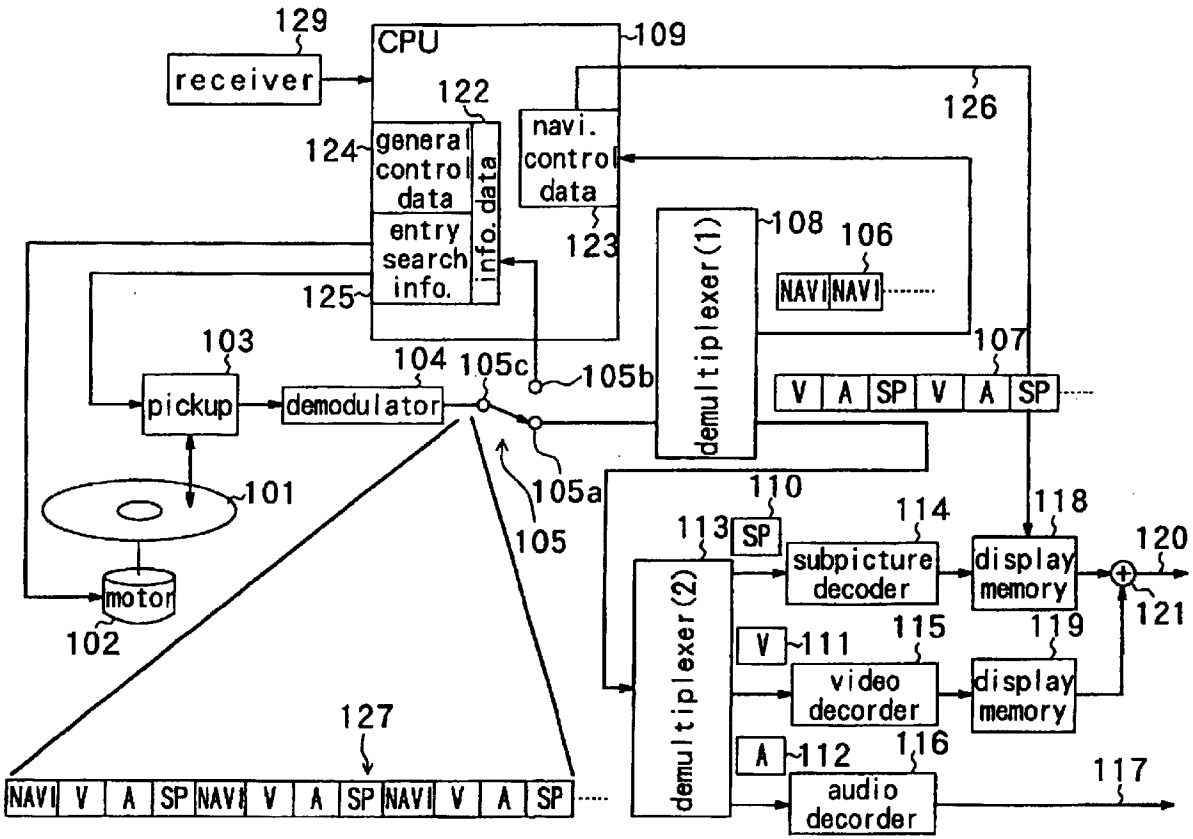
FIG. 13 is a block diagram of a DVD player of the first embodiment of the invention.

Referring to FIG. 13, an example of the configuration of the DVD player as a menu control apparatus of the embodiment will be described. The DVD player shown comprises: a motor 102 for rotating a DVD 101; a pickup 103 placed to face the DVD 101 rotated by the motor 102 for detecting information recorded on the DVD 101; a demodulator 104 for demodulating and outputting signals outputted from the pickup 103; and a switch 105 including two fixed contacts 105a and 105b and a moving contact 105c coupled to the output of the demodulator 104. The pickup 103 optically reads information recorded on the DVD 101 through radiating the DVD 101 with light and detecting return light. The pickup 103 includes a drive apparatus for controlling a position on the DVD 101 at which information is read through shifting a radiation point onto the DVD 101 along the radius of the DVD 101.

The DVD player further comprises a demultiplexer (1) 108 whose input is coupled to the fixed contact 105a of the switch 105. The demultiplexer (1) 108 divides output signals of the demodulator 104 received through the switch 105 into navigation packs (shown in NAVI) 106 for controlling a replay method of the DVD player and presentation data 107 which is information to be provided for the viewer. The DVD player further comprises a central processing unit (CPU) 109 as a computer of the invention for receiving signals from the fixed contact 105b of the switch 105 and the navigation packs 106 from the demultiplexer (1) 108 and for controlling the motor 102, the pickup 103 and the switch 105. The CPU 109 includes a read only memory (ROM) retaining a program and a random access memory (RAM) as a work area. The CPU 109 performs operations described below by implementing the program stored in the ROM with the RAM as the work area.

The DVD player further comprises: a demultiplexer (2) 113 for dividing the presentation data 107 from the demultiplexer (1) 108 into a coded subpicture signal (shown as SP) 110, a coded video signal (shown as V) 111 and coded audio data (shown as A) 112; a subpicture decoder 114 for decoding the subpicture signal 110 from the demultiplexer (2) 113; a video decoder 115 for decoding the video signal 111 from the demultiplexer (2) 113; an audio decoder 116 for decoding the audio signal 112 from the demultiplexer (2) 113 and outputting an audio output signal 117; a display memory 118 for storing the decoded subpicture signal from the subpicture decoder 114 and generating a subpicture; a display memory 119 for storing the decoded video signal from the video decoder 115 and generating a moving picture; and an adder 121 for adding output signals of the display memories 118 and 119 and outputting a video output signal 120.

The CPU 109 includes, in the RAM, an information data storage region 122 for storing information data and a navigation control data storage region 123 for storing navigation control data included in the navigation packs 106. The information data storage region 122 includes a general control data storage region 124 for storing general control data and an entry search information storage region 125 for storing entry search information. The information data is inputted through the switch 105. The CPU 109 sends a highlight display control signal 126 to the display memory 118. The highlight display control signal 126 controls highlighting of the subpicture stored in the navigation control data storage region 123.

The DVD player further comprises a receiver 129 for receiving a signal from the remote controller 92, manipulating the signal for conversion to a signal corresponding to the key operation of the remote controller and sending the signal to the CPU 109.

The operation of the DVD player shown in FIG. 13 will now be described. Loading of information data by the DVD player will be first described. The CPU 109 has the switch 105 switched to the fixed contact 105b and loads general control data and entry search information from the DVD 101 by activating the pickup 103 and the motor 102 with servo control. The CPU 109 has the general control data and the entry search information stored in the storage regions 124 and 125, respectively. The general control data includes static information required for replay such as the aspect ratio of the video and the type of coding and the number of channels of the audio. The entry search information is a table of information of addresses on the DVD 101 where the multiplexed data of each menu page and the multiplexed data of each title is located. Using the entry search information, the DVD player moves the pickup 103 to the designated address of the selected menu or title and starts a replay.

The operation of menu replay by the DVD player will now be described. The CPU 109 has the switch 105 switched to the fixed contact 105a and determines the initial address of the menu from the entry search information. The CPU 109 activates the pickup 103 and the motor 102 and obtains a replay signal from the pickup 103 so as to load information of the menu. The replay signal is restored to normal digital signals by the demodulator 104 to be a replay stream 127. Being enlarged schematically, the replay stream 127 looks like a navigation pack (NAVI), a video signal (V), an audio signal (A) and a subpicture signal (SP) multiplexed in sequence.

Next, the replay stream 127 outputted from the demodulator 104 is divided into the navigation packs 106 and the presentation data 107 by the demultiplexer (1) 108. The navigation packs 106, one of the divided data, is stored in the storage region 123 in the CPU 109. Since the navigation packs 106 include the highlight information data 72 shown in FIG. 9, instructions for replaying the menu (the adjacent button data 82, the button command 83 and so on in FIG. 9) are stored in the CPU 109 as well in this stage.

The presentation data 107, the other of the data divided by the demultiplexer (1) 108, is further divided into the subpicture signal 110, the video signal 111 and the audio signal 112 by the demultiplexer (2)113. The signals are each restored to a decoded subpicture signal, a decoded video signal and a decoded audio signal by the respective decoders 114 to 116. The subpicture signal outputted from the decoder 114 and the video signal outputted from the decoder 115 are each temporarily stored in the display memories 118 and 119, respectively. The subpicture signal and the video signal are then added to each other at the adder 121 and outputted as the video output signal 120. The highlight display control signal 126 is given to the display memory 118 from the CPU 109. For shifting a highlighted button on the menu by operating the cursor keys of the remote controller, for example, the CPU 109 directly rewrites the data corresponding to highlighting in the display memory 118, using the highlight display control signal 126. The visual effect of highlight color shifting is thereby achieved.

As previously described, the PGC of each menu is recorded on the disk as the PGC information table as part of the area called general control data. The general control data on the disk is loaded in the CPU 109 and stored in the storage region 124. To be more specific, the PGC information table stored in the storage region 124 indicates the relationship among the PGC, the VOB ID number and the cell ID number. The storage region 125 retains the VOB information table indicating the physical addresses on the disk corresponding to the PGC, the VOB ID number and the cell ID number in the PGC information table. Therefore, in order to replay the menu of the embodiment, the CPU 109 reads the PGC information table in the storage region 124 so as to obtain the VOB ID number and the cell ID number of the PGC. The CPU 109 thus obtains the physical addresses on the disk corresponding to the VOB ID number and the cell ID number in the VOB information table in the storage region 125.

Referring to the flowcharts shown in FIG. 16 and FIG. 17, the operation of menu replay by the DVD player of the embodiment of the invention will now be described. The following operation mainly corresponds to the operation of the CPU 109 in the example shown in FIG. 13.

The operation is started by the viewer instructing the DVD player to replay a specific menu with the remote controller (step S100). The CPU 109 of the DVD player executes the PGC for the root menu (step S101). Following the PRE CMD , the CPU 109 shifts to the chapter menu and starts a replay of the chapter menu (step S102). Since the PGC for the chapter menu does not include any instruction corresponding to the PRE CMD, the CPU 109 replays the cell of cell number CN #1, that is, the menu 10 of the first page in FIG. 4 (step S103). The BTN #1 is thereby brought to the state of select highlight (step S104). The CPU 109 determines whether any key of the remote controller is pressed (step S105). If no key is pressed (N in step S105), the CPU 109 replays the cell of cell number CN #1 to the end and executes the cell CMD corresponding to cell number CN #1 (step S106). Since the cell CMD is an instruction to shift to the start of its own cell, the CPU 109 shifts to the start of cell number CN #1 and starts to replay (step S107). The CPU 109 then returns to step S105 and repeats replaying the menu 10 of the first page until any key input is made from the remote controller. If any key of the remote controller is pressed (Y in step S105), the CPU 109 determines which key is pressed (step S108). If either the left or the right cursor key is pressed, the CPU 109 goes to step S106, continues the replay of the menu 10 and waits for key input from the remote controller. If either the up or the down cursor key is pressed, the CPU 109 shifts the select highlighting to the adjacent button (step S109), returns to step S105 and waits for key input from the remote controller.

If the menu enter key is pressed, the CPU 109 determines which menu button is in the state of select highlight (step S110). If the BTN #1 is in the state of select highlight, the CPU 109 brings the BTN #1 to the state of action highlight (step S111) and executes the BTN CMD #1 in the cell of cell number CN #1 (step S112). The CPU 109 then enters '1' as the final destination chapter number for parameter (GP) 1 and shifts to the cell of cell number CN #3 (step S113) and replays the dynamic highlight picture (1) 15 in FIG. 4 (step S114). If the BTN #2 is in the state of select highlight, the CPU 109 brings the BTN #2 to the state of action highlight (step S115) and executes the BTN CMD #2 in the cell of cell number CN #1 (step S116). The CPU 109 then enters '2' as the final destination chapter number for GP 1 and shifts to the cell of cell number CN #3 (step S117) and replays the dynamic highlight picture (1) 15 in FIG. 4 (step S114). After the operation of the BTN #1 or #2 is determined and the dynamic highlight picture (1) 15 is replayed, the CPU 109 executes the cell CMD corresponding to the cell of cell number CN #3 (step S121) and shifts to the last POST CMD of the PGC (step S122).

If the BTN #3 is in the state of select highlight, the CPU 109 brings the BTN #3 to the state of action highlight (step S118) and executes the BTN CMD #3 in the cell of cell number CN #1 (step S119). The CPU 109 then shifts to the cell of cell number CN #2 and replays the menu 16 of the second page (step S120) and brings the BTN #5 on the menu to the state of select highlight (step S125).

Having brought the BTN #5 to the state of select highlight, the CPU 109 performs the steps similar to those for the first page of the menu. That is, the CPU 109 determines whether any key of the remote controller is pressed (step S126). If no key is pressed (N in step S126), the CPU 109 replays the cell of cell number CN #2 to the end and executes the cell CMD corresponding to cell number CN #2 (step S127). The CPU 109 shifts to the start of cell number CN #2 and starts a replay (step S128). The CPU 109 then returns to step S126 and waits for key input from the remote controller. If any key of the remote controller is pressed (Y in step S126), the CPU 109 determines which key is pressed (step S129). If either the left or the right cursor key is pressed, the CPU 109 goes to step S127. If either the up or the down cursor key is pressed, the CPU 109 shifts the select highlighting to the adjacent button (step S130) and returns to step S126.

If the menu enter key is pressed, the CPU 109 determines which menu button is in the state of select highlight (step S131). If the BTN #5 is in the state of select highlight, the CPU 109 brings the BTN #5 to the state of action highlight (step S132) and executes the BTN CMD #5 in the cell of cell number CN #2 (step S133). The CPU 109 then enters '3' as the final destination chapter number for GP 1 and shifts to the cell of cell number CN #4 (step S134) and replays the dynamic highlight picture (2) 21 in FIG. 4 (step S135). If the BTN #6 is in the state of select highlight, the CPU 109 brings the BTN #6 to the state of action highlight (step S136) and executes the BTN CMD #6 in the cell of cell number CN #2 (step S137). The CPU 109 then enters '4' as the final destination chapter number for GP 1 and shifts to the cell of cell number CN #4 (step S138) and replays the dynamic highlight picture (2) 21 in FIG. 4 (step S135).

If the BTN #4 is in the state of select highlight, the CPU 109 brings the BTN #4 to the state of action highlight (step S139) and executes the BTN CMD #4 in the cell of cell number CN #2 (step S140). The CPU 109 then shifts to the cell of cell number CN #1 and replays the menu 10 of the first page (step S141) and returns to step S104.

After the operation of the BTN #1, #2, #5 or #6 is determined and the dynamic highlight picture (1) or (2) is replayed, the CPU 109 executes the POST CMD of the PGC for the chapter menu (step S123) and shifts to the designated chapter, following the value entered for GP 1 (step S124). That is, the CPU 109 replays chapter (1) when GP 1=1, chapter (2) when GP 1=2, chapter (3) when GP 1=3 and chapter (4) when GP 1=4. The operation relating to the chapter menu is thus completed.

According to the recording medium retaining data for menu control, the menu control method and the menu control apparatus of the embodiment described so far, the menu is implemented with the moving picture with sound. Furthermore, after the operation of the menu button is determined, the dynamic highlight picture (1) and (2) of moving pictures with sound are automatically replayed and then an actual replay of the chapter of the title is started. As a result, the action highlighting of the selected menu button is more emphasized. The menu highly expressive and attractive to the viewer is thereby produced.

Furthermore, the VOB and the PGC of the menu and the dynamic highlight picture are each collected as one and recorded in orderly sequence. Authoring of the DVD is therefore easily achieved. In addition, various kinds of data written in the PGC are recorded as the PGC information table in one region on the disk and all the data is completely read by accessing once. A replay with excellent response is thereby achieved by the DVD player.

Second Embodiment

A second embodiment of the invention will now be described. The embodiment provides a menu made up of a plurality of pages wherein a replay of the dynamic highlight picture is further achieved when the menu page is switched to another. Like numerals are assigned to the components similar to those of the first embodiment and descriptions thereof are omitted.

In this example, the contents of the BTN CMD (#3) 51 of the BTN #3, the BTN CMD (#4) 52 of the BTN #4 and the POST CMD 60 in FIG. 6 are as follows.

The content of the BTN CMD (#3) 51 is an instruction to enter '10' for GP 1 and to shift to the cell 43 of cell number CN #3.

The content of the BTN CMD (#4) 52 is an instruction to enter '20' for GP 1 and to shift to the cell 44 of cell number CN #4.

The content of the POST CMD 60 is an instruction to shift to the designated one of chapters (1) to (4) when the value of GP 1 is any of '1' to '4', to shift to the cell 42 of cell number CN #2 when the value of GP 1 is '10' or to shift to the cell 41 of cell number CN #1 when the value of GP 1 is '20'.

Figure 18:
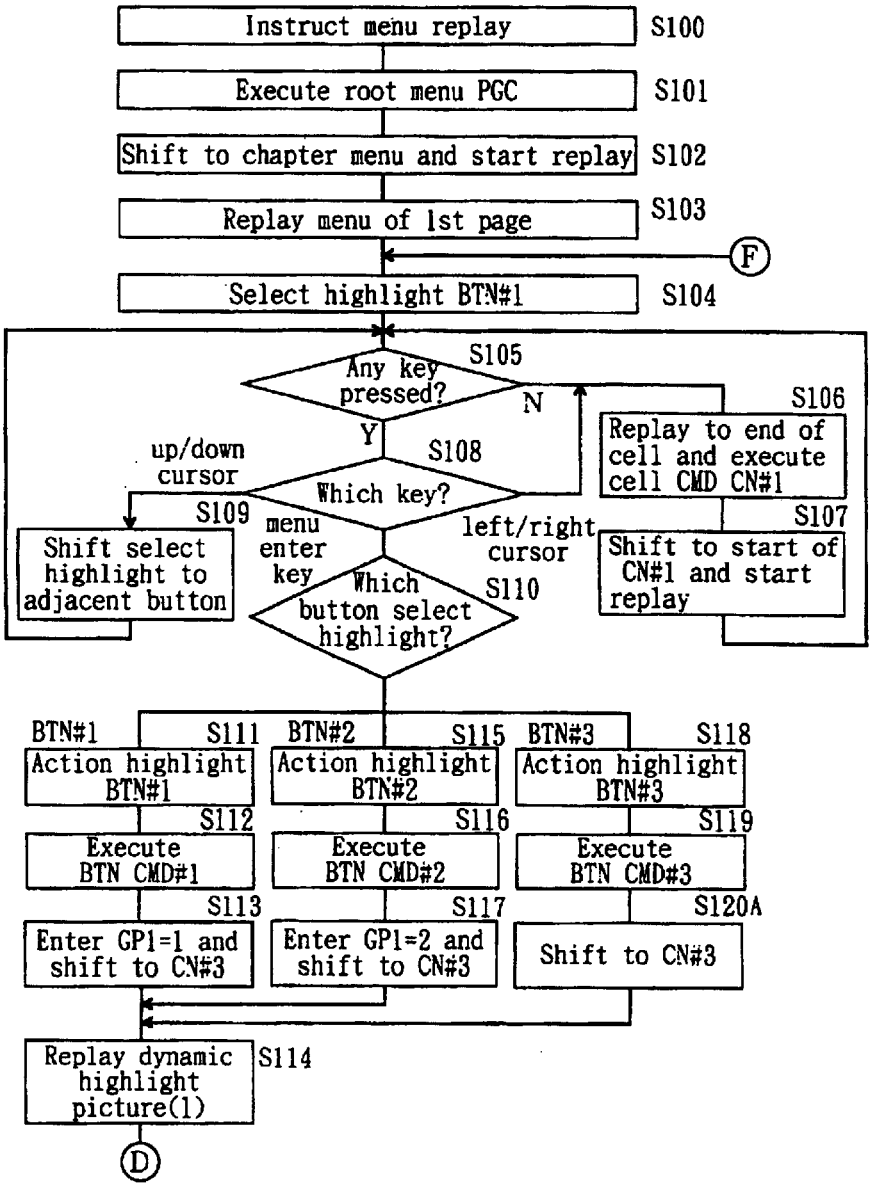
FIG. 18 is a flowchart of replay operation of a second embodiment of the invention.
Figure 19:
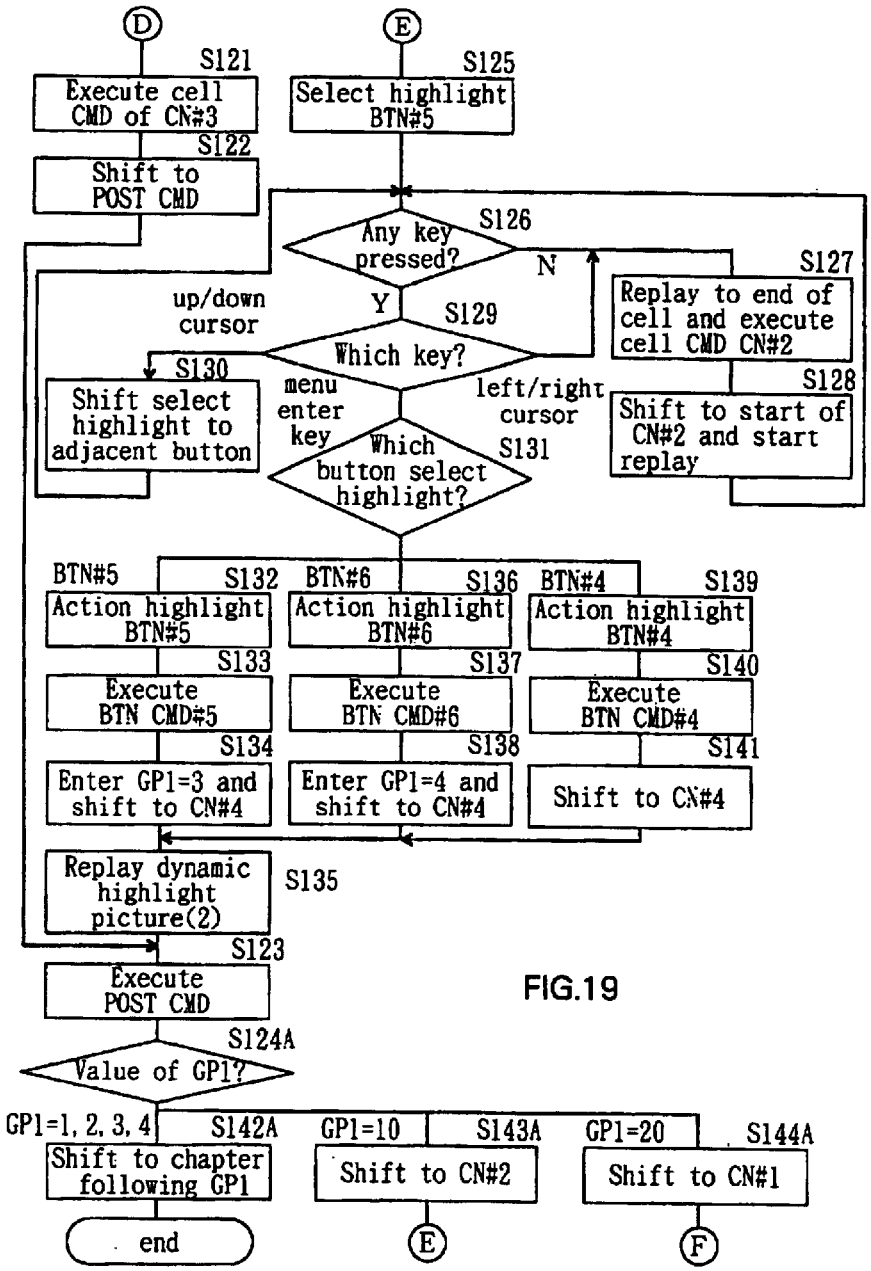
FIG. 19 is a flowchart of replay operation that follows FIG. 18.

Referring to FIG. 18 and FIG. 19, the operation of menu replay by the DVD player of the embodiment will now be described. When the operation of the BTN #3 on the menu of the first page is determined and the BTN #3 is brought to the state of action highlight (step S118), the CPU 109 executes the BTN CMD #3 (step S119). The CPU 109 enters '10' for GP 1 and shifts to the cell of cell number CN #3 (step S120A) and replays the dynamic highlight picture (1) 15 in FIG. 4 (step S114). After the dynamic highlight picture (1) 15 is replayed, the CPU 109 executes the cell CMD corresponding to cell number CN #3 (step S121) and shifts to the last POST CMD of the PGC (step S122).

When the operation of the BTN #4 on the menu of the second page is determined and the BTN #4 is brought to the state of action highlight (step S139), the CPU 109 executes the BTN CMD #4 (step S140). The CPU 109 enters '20' for GP 1 and shifts to the cell of cell number CN #4 (step S141A) and replays the dynamic highlight picture (2) 21 in FIG. 4 (step S135).

After the dynamic highlight picture (1) or (2) is replayed, the CPU 109 executes the POST CMD (step S123) and determines the value of GP 1 (step S124A). Depending on the value of GP 1, the CPU 109 performs the following steps. When the value of GP 1 is '10', that is, the operation of BTN #3 on the menu of the first page is determined, the CPU 109 shifts to the cell of cell number CN #2 and replays the menu of the second page (step S143A) and goes to step S125. When the value of GP 1 is '20', that is, the operation of BTN #4 on the menu of the second page is determined, the CPU 109 shifts to the cell of cell number CN #1 and replays the menu of the first page (step S144A) and goes to step S104. When the value of GP 1 is any of '1', '2', '3' and '4', that is, the operation of any of BTN #1, #2, #5 and #6 is determined, the CPU 109 shifts to the chapter corresponding to the value of GP 1 and starts a replay of the chapter (step S142A).

Figure 16:
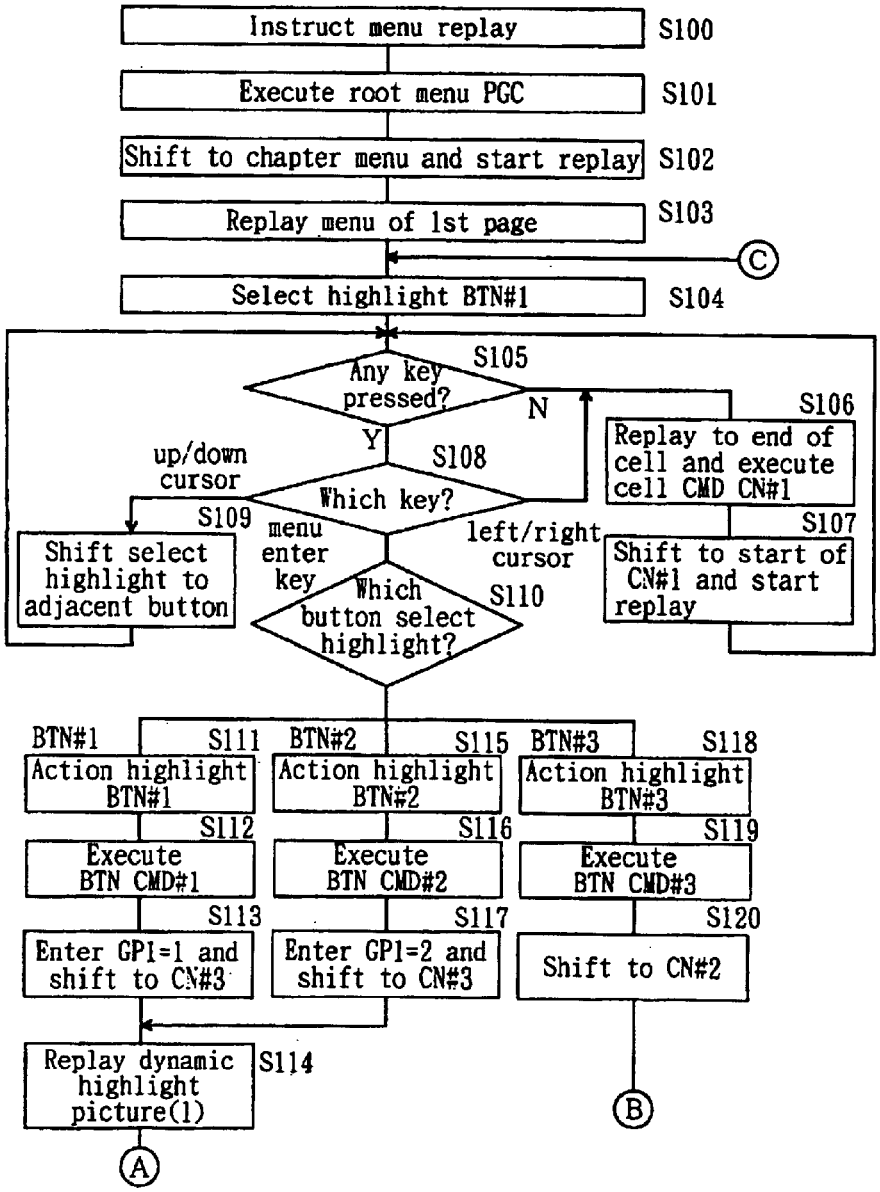
FIG. 16 is a flowchart of operation for replaying a PGC in a DVD player wherein the replay operation shown in FIG. 4 is performed.
Figure 17:
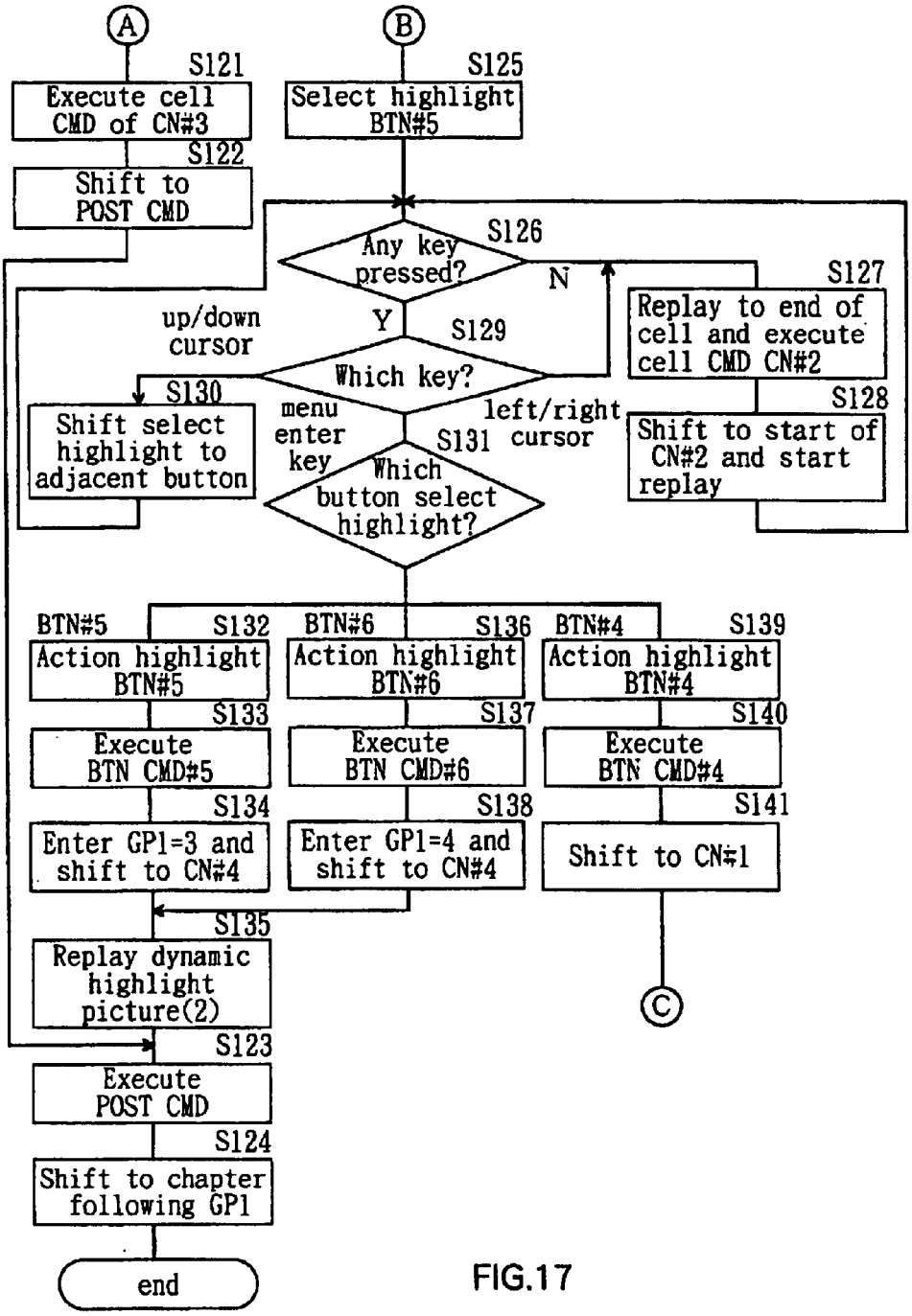
FIG. 17 is a flowchart of replay operation that follows FIG. 16.

The remainder of the steps shown in FIG. 18 and FIG. 19 are similar to those of the first embodiment (FIG. 16 and FIG. 17).

According to the second embodiment thus described, when the operation of the BTN (#3) 14 on the menu 10 of the first page in FIG. 4 is determined, the moving picture of the dynamic highlight picture (1) 15 is automatically replayed before the CPU 109 shifts to the start of the moving picture of the menu 16 of the second page and starts a replay of the menu 16. When the operation of the BTN (#4) 20 on the menu 16 of the second page is determined, the moving picture of the dynamic highlight picture (2) 21 is automatically replayed before the CPU 109 shifts to the start of the moving picture of the menu 10 of the first page and starts a replay of the menu 10. The dynamic highlighting is thus inserted as well when the menu page is switched to the other one. Creation of the more attractive menu is thereby achieved.

The dynamic highlighting may be inserted when the menu page is switched to the other one by the following procedure as well. Another cell is added for the dynamic highlight picture replayed when the menu page is switched. The BTN CMD 51 of the BTN (#3) 14 in FIG. 4 is provided as an instruction to shift to the additional cell. The cell CMD of the additional cell is provided as an instruction to shift to the cell of cell number CN #2. Similarly, the BTN CMD 52 of the BTN (#4) 20 is provided as an instruction to shift to the additional cell. The cell CMD of the additional cell is provided as an instruction to shift to the cell of cell number CN #1.

The remainder of the configuration, operation and effects of the second embodiment are similar to those of the first embodiment.

Third Embodiment

A third embodiment of the invention will now be described. The embodiment provides an example wherein the VOB and the PGC of the menu and the dynamic highlight picture are each divided into a plurality of VOBs and PGCs. Like numerals are assigned to the components similar to those of the first embodiment and descriptions thereof are omitted. For brevity, a menu consisting of one page is described in this example and description of the dummy PGC of the root menu is omitted.

Figure 20:
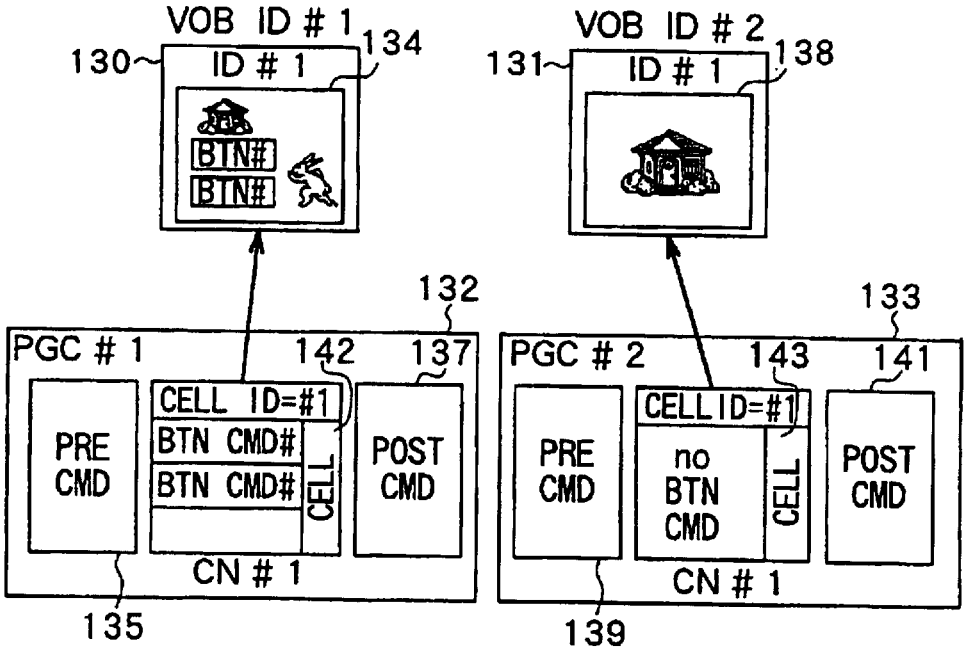
FIG. 20 illustrates the data structure of a third embodiment of the invention.

FIG. 20 illustrates the structures of the VOB and PGC of the menu of the embodiment. The items of data for the menu and those for the dynamic picture are each divided and recorded in an individual VOB 130 and a VOB 131. The PGC corresponding to the respective VOBs 130 and 131 is divided into a PGC 132 and a PGC 133 as well. The VOB 130 and the VOB 131 are each defined as VOB #1 and VOB #2, respectively. The VOB ID numbers thereof are #1 and #2, respectively. The PGC 132 and the PGC 133 are each defined as PGC #1 and PGC #2, respectively.

Since the menu consists of one page, the VOB 130 for recording data for the menu is made up of a single cell 134. The cell number of the cell 134 is CN #1 and the cell ID number thereof is #1. The PGC 132 corresponding to the VOB 130 includes a PRE CMD 135, information relating to the cell 134 and a POST CMD 137. The information relating to the cell 134 includes the cell ID number, two BTN CMD #1 and #2 and a cell CMD 142.

Since the dynamic highlight picture is one, the VOB 131 is made up of a single cell 138. The cell number of the cell 138 is CN #1 and the cell ID number thereof is #1. The PGC 133 corresponding to the VOB 131 includes a PRE CMD 139, information relating to the cell 138 and a POST CMD 141. The information relating to the cell 138 includes the cell ID number and a cell CMD 143. Since the dynamic highlight picture includes no menu button, there is no BTN CMD corresponding to the cell 138.

The contents of the navigation commands of the PGCs 132 and 133 are as follows. The PGC 132 for the chapter menu includes the PRE CMD 135, the BTN CMD #1 and #2 for the respective menu buttons, the cell CMD 142 and the POST CMD 137.

There is no instruction corresponding to the PRE CMD 135. Therefore, after the shift to the chapter menu, the operation shifts to the cell 134 of cell ID #1.

The contents of the BTN CMD #1 and #2 in the cell 134 of cell ID #1 are as follows.

The content of the BTN CMD #1 is an instruction to enter '1' as the final destination chapter number for GP 1 and to shift to the PGC 133 for the dynamic highlight picture.

The content of the BTN CMD #2 is an instruction to enter '2' as the final destination chapter number for GP 1 and to shift to the PGC 133 for the dynamic highlight picture.

The content of the cell CMD 142 corresponding to the cell 134 is an instruction to shift to the start of its own cell.

There is no instruction corresponding to the POST CMD 137.

The PGC 133 for the dynamic highlight picture includes the PRE CMD 139, the cell CMD 143 and the POST CMD 141. There is no instruction corresponding to the PRE CMD 139 and the cell CMD 143.

The content of the POST CMD 141 is an instruction to shift to the chapter of the number written in GP 1. That is, if '1' is entered for GP 1, the instruction is to shift to chapter (1). If '2' is entered for GP 1, the instruction is to shift to chapter (2).

Figure 21:
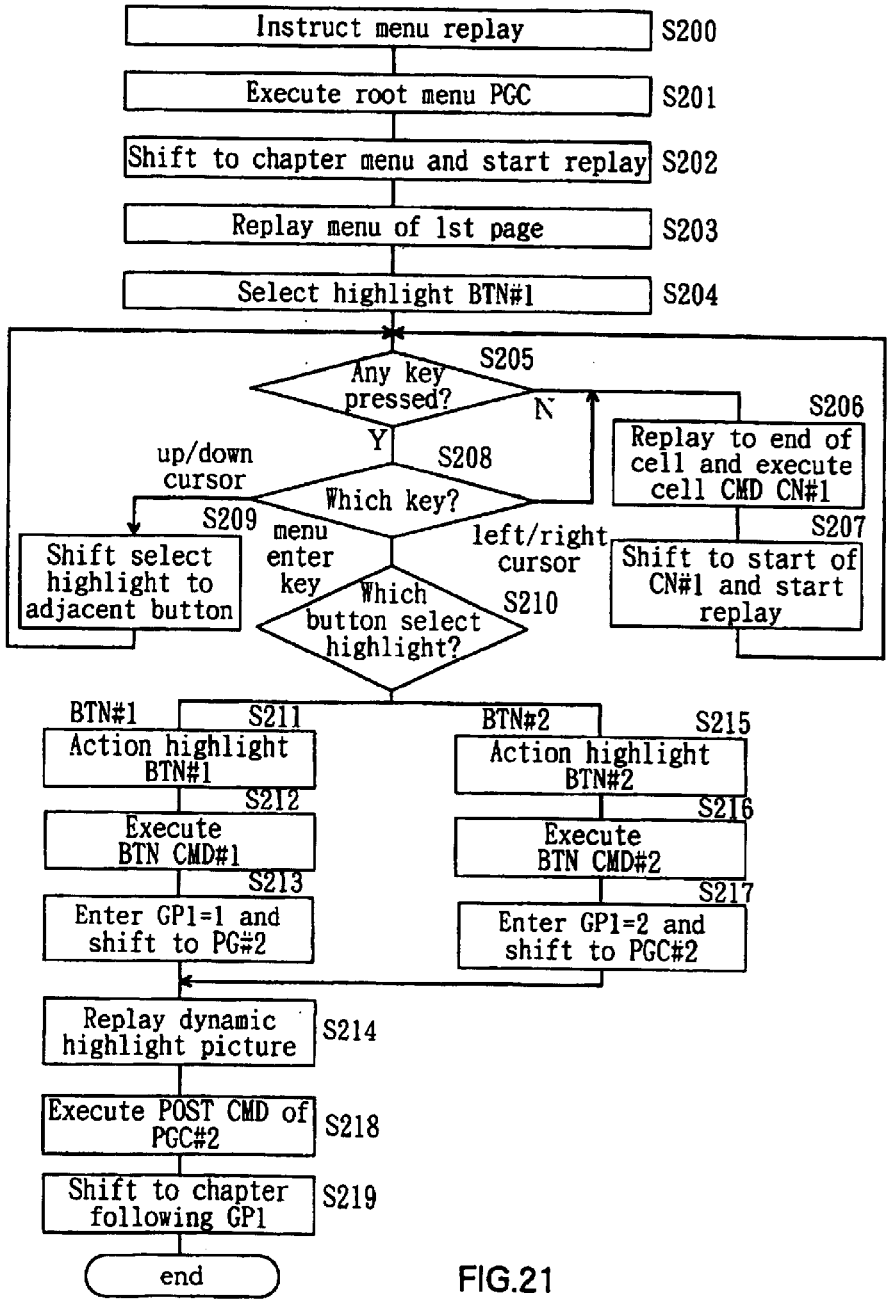
FIG. 21 is a flowchart of replay operation of a third embodiment of the invention.

Referring to the flowchart shown in FIG. 21, the operation of menu replay by the DVD player of the embodiment will now be described. The operation is started by the viewer instructing the DVD player to replay a specific menu with the remote controller (step S200). The CPU 109 of the DVD player executes the PGC for the root menu (step S201). Following the PRE CMD , the CPU 109 shifts to the chapter menu and starts a replay of the chapter menu (step S202). Since the PGC (#1) 132 for the chapter menu does not include any instruction corresponding to the PRE CMD 135, the CPU 109 replays the cell 134 of cell number CN #1, that is, the menu (step S203). The BTN #1 is then brought to the state of select highlight (step S204). The CPU 109 determines whether any key of the remote controller is pressed (step S205). If no key is pressed (N in step S205), the CPU 109 replays the cell 134 of cell number CN #1 to the end and executes the cell CMD 142 corresponding to cell number CN #1 (step S206). Since the cell CMD 142 is an instruction to shift to the start of its own cell, the CPU 109 shifts to the start of the cell 134 of cell number CN #1 and starts a replay (step S207). The CPU 109 then returns to step S205 and repeats replaying the menu until any key input is made from the remote controller. If any key of the remote controller is pressed (Y in step S205), the CPU 109 determines which key is pressed (step S208). If either the left or the right cursor key is pressed, the CPU 109 goes to step S206, continues the replay of the menu and waits for key input from the remote controller. If either the up or the down cursor key is pressed, the CPU 109 shifts the select highlighting to the adjacent button (step S209), returns to step S205 and waits for key input from the remote controller.

If the menu enter key is pressed, the CPU 109 determines which menu button is in the state of select highlight (step S210). If the BTN #1 is in the state of select highlight, the CPU 109 brings the BTN #1 to the state of action highlight (step S211) and executes the BTN CMD #1 in the cell 134 of cell number CN #1 (step S212). The CPU 109 then enters '1' as the final destination chapter number for GP 1 and shifts to the PGC (#2) 133 (step S213) and replays the dynamic highlight picture (step S214).

If the BTN #2 is in the state of select highlight, the CPU 109 brings the BTN #2 to the state of action highlight (step S215) and executes the BTN CMD #2 in the cell 134 of cell number CN #1 (step S216). The CPU 109 then enters '2' as the final destination chapter number for GP 1 and shifts to the PGC (#2) 133 (step S217) and replays the dynamic highlight picture (step S214). After the operation of the BTN #1 or #2 is determined and the dynamic highlight picture is replayed, the CPU 109 executes the last POST CMD 141 of the PGC (#2) 133 (step S218) and shifts to the designated chapter, following the value entered for GP 1 (step S219). That is, the CPU 109 replays chapter (1) when GP 1=1 or chapter (2) when GP 1=2. The operation relating to the chapter menu is thus completed.

According to the third embodiment described so far, the items of data for the menu and those for the dynamic picture are each divided and recorded in the individual VOBs and PGCs. Therefore, by changing the number assigned to the PGC to be linked to the pair of VOB and PGC, an increase of menu pages or a change in configuration may be achieved. In terms of programming of navigation commands, programming is easily performed and versatility of the program thereby produced is enhanced.

For generating the menu with a plurality of pages, a pair of the structures of VOB and PGC described above is provided for each page. For example, the VOB and PGC corresponding to the new page are defined as VOB #3, VOB #4, PGC #3 and PGC #4. An instruction to shift to the PGC corresponding to the destination page is written for the BTN CMD for the menu page switching.

The remainder of the configuration, operation and effects of the third embodiment are similar to those of the first embodiment.

The invention is not limited to the foregoing embodiments but may be practiced in still other ways. For example, although the response picture used for determining the operation of the menu buttons is the moving picture with sound in the foregoing embodiments, the picture may be a still picture or a picture without sound. Similarly, the menu may be a still picture or a picture without sound. In addition, the recording medium retaining data for menu control of the invention is not limited to a DVD as described in the foregoing embodiments but may be any other type of recording medium. Similarly, the menu control method and apparatus of the invention are not limited to the application wherein a menu used for replaying information recorded on a DVD by a DVD player is displayed but may be applied to display of a menu used for replaying information recorded on any other medium. Furthermore, instead of using menu control data recorded on a removable medium like a DVD, the invention may be utilized in an application wherein a menu is displayed through the use of menu control data stored in a memory of a computer in advance.

According to the recording medium retaining data for menu control, the menu control method and apparatus of the invention, the response picture is displayed by using the response picture data in response to determination of the operation of the menu button on the menu displayed by using the menu display data. After the response picture is displayed, the function assigned to the menu button is executed. As a result, the action of determining the operation of the menu button is dynamic. The menu highly expressive and attractive to the viewer is thereby created.

According to the recording medium retaining data for menu control, the menu control method and apparatus of the invention, the response picture may be displayed, using data including a moving picture as the response picture data. Creation of the menu more attractive to the viewer is thereby achieved.

According to the recording medium retaining data for menu control, the menu control method and apparatus of the invention, the response picture may be displayed, using data including a picture with sound as the response picture data. Creation of the menu more attractive to the viewer that is not only visually attractive but also appealing to the ear is thereby achieved.

According to the recording medium retaining data for menu control of the invention, the menu may be displayed, using data including a moving picture with sound as the menu data. Creation of the menu easy to use and more attractive to the viewer is thereby achieved.

According to the recording medium retaining data for menu control of the invention, the menu display data and the response picture data is collected and recorded as a series of data. As a result, creation of the menu is easily achieved. In addition, the frequency of datra loading from the recording medium is reduced and the operation speed of the menu and the response picture is improved.

Obviously many modifications and variations of the present invention are possible in the light of the above teachings. It is therefore to be understood that within the scope of the appended claims the invention may be practiced otherwise than as specifically described.

What is claimed is:

1. A disk recording medium retaining menu control data for controlling a menu displayed on a screen, wherein said menu control data has a data structure including:

a video object defining a display of said menu; said video object omporisng a plurality of cells;

each cell containing menu display data which determines the configuration and operations displayed on a page of said menu, the menu display data being determined at least in part on the basis of previously selected operations;

response picture data which contains pictures to be displayed when an operation is selected from said menu;

response display data which provides instructions for displaying the response picture data in place of said menu after the operation is selected and before the operation is performed, thereby indicating a transition between said menu and the selected operation; and operation instructions for performing the selected operation after the response picture data is displayed.

2. A recording medium according to claim 1 wherein said response picture includes a moving picture.

3. A recording medium according to claim 1 wherein said response picture includes a picture with sound.

4. A recording medium according to claim 1, wherein said response display data includes data specifying the operation assigned to said menu button and said operation instructions execute the specified operation.

5. A recording medium according to claim 1, wherein said menu display data includes data for varying the display of said menu button depending on whether said menu button is not selected, or said menu button is provisionally selected or said menu button is selected.

6. A recording medium according to claim 1 wherein said menu includes a moving picture with sound.

7. A recording medium according to claim 1 wherein said menu display data and said response picture data is recorded as a series of data.

8. A menu control method for controlling a menu of operation for operating a disk recording medium, the menu being displayed on a screen, including the steps of:

defining a display of said menu by a video object comprising a plurality of cells; each cell containing menu display data which determines the configuration and operations displayed on a page of said menu;

displaying said menu including at least one menu button for selecting an operation of said disk recording medium, the displayed menu being determined at least in part on the basis of previously selected operations;

displaying response picture data in place of said menu when the operation of said menu button on said menu is selected, thereby indicating a transition between said menu and the selected operation;

providing instructions in accordance with response display data for displaying the response picture data after the operation is selected and before the operation is executed; and executing the selected operation of said menu button after said response picture data is displayed.

9. A menu control method according to claim 8 wherein said response picture includes a moving picture.

10. A menu control method according to claim 8 wherein said response picture includes a picture with sound.

11. A menu control apparatus for controlling a menu of operations for operating a disk recording medium, the menu being displayed on a screen, comprising:

a menu display means for displaying said menu including at least one menu button for selecting an operation of said disk recording medium, the displayed menu being determined at least in part on the basis of previously selected operations and being defined by a video object comprising a plurality of cells; each cell containing menu display data which determines the configuration and operations displayed on a page of said menu;

a response picture display means for displaying response picture data in place of said menu when the operation of said menu button on said menu is selected, thereby indicating a transition between said menu and the selected operation;

means for providing instructions in accordance with response display data for displaying the response picture data after the operation is selected and before the operation is executed; and a means for executing the selected operation of said menu button after said response picture data is displayed by said response picture display means.

12. A menu control apparatus according to claim 11 wherein said response picture display means displays said response picture including a moving picture.

13. A menu control apparatus according to claim 11 wherein said response picture display means displays said response picture including a picture with sound.

*14. A recording medium retaining menu control data for controlling a menu displayed on a screen, wherein said menu control data has a data structure including:*

*a video object defining a display of said menu; said video object comprising one or more cells;*

*at least one of said one or more cells containing menu display data which determines the configuration and a*

*menu button for selecting an operation displayed on a page of said menu, the displayed page of said menu being determined at least in part on the basis of a previously selected operation;*

*response picture data which contains a response picture to be displayed when an operation is selected from the displayed page of said menu;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed.*

*15. The recording medium according to claim 14, wherein said response picture includes a moving picture.*

*16. The recording medium according to claim 14, wherein said response picture includes a picture with sound.*

*17. The recording medium according to claim 14, wherein said response display data includes data specifying the operation assigned to said menu button and said operation instruction execute the specified operation.*

*18. The recording medium according to claim 14, wherein said menu display data includes data for varying the display of said menu button depending on whether said menu button is not selected, or said menu button is provisionally selected or said menu button is selected.*

*19. The recording medium according to claim 14, wherein said menu includes a moving picture with sound.*

*20. The recording medium according to claim 14, wherein said menu display data and said response picture data is recorded as a series of data.*

*21. The recording medium according to claim 14, wherein said menu control data are consistent with a DVD format.*

*22. A DVD format recording medium retaining menu control data for controlling a menu displayed on a screen, wherein said menu control data has a data structure including:*

*a video object defining a display of said menu; said video object comprising one or more cells;*

*at least one said cell containing menu display data which determines the configuration and a menu button for selecting an operation displayed on a page of said menu, the displayed page of said menu being determined at least in part on the basis of a previously selected operation;*

*response picture data which contains a response picture to be displayed when an operation is selected from the displayed page of said menu;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed.*

*23. The DVD format recording medium according to claim 22, wherein said response picture includes a moving picture.*

*24. The DVD format recording medium according to claim 22, wherein said response picture includes a picture with sound.*

*25. The DVD format recording medium according to claim 22, wherein said response display data includes data specifying the operation assigned to said menu button and said operation instruction execute the specified operation.*

*26. The DVD format recording medium according to claim 22, wherein said menu display data includes data for varying the display of said menu button depending on whether said menu button is not selected, or said menu button is provisionally selected or said menu button is selected.*

*27. The DVD format recording medium according to claim 22, wherein said menu includes a moving picture with sound.*

*28. The DVD format recording medium according to claim 22, wherein said menu display data and said response picture data is recorded as a series of data.*

*29. A recording medium retaining menu control data for controlling a menu displayed on a screen, wherein said menu control data has a data structure including:*

*a video object defining a display of said menu; said video object comprising a plurality of cells;*

*at least one of said plurality of cells containing menu display data which determines the configuration and a menu button for selecting an operation displayed on a page of said menu, the displayed page of said menu being determined at least in part on the basis of a previously selected operation;*

*response picture data which contains a response picture to be displayed when an operation is selected from the displayed page of said menu;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed.*

*30. The recording medium according to claim 29, wherein a cell other than said at least one of said plurality of cells within the same video object contains said menu display data.*

*31. The recording medium according to claim 29, wherein said response picture includes a moving picture.*

*32. The recording medium according to claim 29, wherein said response picture includes a picture with sound.*

*33. The recording medium according to claim 29, wherein said response display data includes data specifying the operation assigned to said menu button and said operation instruction execute the specified operation.*

*34. The recording medium according to claim 29, wherein said menu display data includes data for varying the display of said menu button depending on whether said menu button is not selected, or said menu button is provisionally selected or said menu button is selected.*

*35. The recording medium according to claim 29, wherein said menu includes a moving picture with sound.*

*36. The recording medium according to claim 29, wherein said menu display data and said response picture data is recorded as a series of data.*

*37. The recording medium according to claim 29, wherein said menu control data are consistent with a DVD format.*

*38. A recording medium retaining menu control data for controlling a menu displayed on a screen, wherein said menu control data has a data structure including:*

*a video object defining a display of said menu; said video object comprising a cell;*

*said cell containing menu display data which determines the configuration and a menu button for selecting an*

*operation displayed on a page of said menu, the displayed page of said menu being determined at least in part on the basis of a previously selected operation;*

*response picture data which contains a response picture to be displayed when an operation is selected from the displayed page of said menu;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed.*

*39. The recording medium according to claim 38, wherein said response picture includes a moving picture.*

*40. The recording medium according to claim 38, wherein said response picture includes a picture with sound.*

*41. The recording medium according to claim 38, wherein said response display data includes data specifying the operation assigned to said menu button and said operation instruction execute the specified operation.*

*42. The recording medium according to claim 38, wherein said menu display data includes data for varying the display of said menu button depending on whether said menu button is not selected, or said menu button is provisionally selected or said menu button is selected.*

*43. The recording medium according to claim 38, wherein said menu includes a moving picture with sound.*

*44. The recording medium according to claim 38, wherein said menu display data and said response picture data is recorded as a series of data.*

*45. The recording medium according to claim 38, wherein said menu control data are consistent with a DVD format.*

*46. A recording medium retaining menu control data for controlling a menu displayed on a screen, wherein said menu control data has a data structure including:*

*video objects each comprising a cell, at least one of said video objects defining a display of said menu, a cell of said at least one of said video objects containing menu display data which determines the configuration and a menu button for selecting an operation displayed on a page of said menu, the displayed page of said menu being determined at least in part on the basis of a previously selected operation;*

*response picture data which contains a response picture to be displayed when an operation is selected from the displayed page of said menu;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed.*

*47. The recording medium according to claim 46, wherein said response picture data is contained in a cell which belongs to a different video object to which the cell containing the menu display data is included.*

*48. The recording medium according to claim 46, wherein said response picture includes a moving picture.*

*49. The recording medium according to claim 46, wherein said response picture includes a picture with sound.*

*50. The recording medium according to claim 46, wherein said response display data includes data specifying the operation assigned to said menu button and said operation instruction execute the specified operation.*

*51. The recording medium according to claim 46, wherein said menu display data includes data for varying the display of said menu button depending on whether said menu button is not selected, or said menu button is provisionally selected or said menu button is selected.*

*52. The recording medium according to claim 46, wherein said menu includes a moving picture with sound.*

*53. The recording medium according to claim 46, wherein said menu display data and said response picture data is recorded as a series of data.*

*54. The recording medium according to claim 46, wherein said menu control data are consistent with a DVD format.*

*55. A recording medium retaining menu control data for controlling a menu displayed on a screen, wherein said menu control data has a data structure including:*

*a video object defining a display of said menu; said video object comprising a plurality of cells;*

*at least one of said plurality of cells containing menu display data which determines the configuration and a menu button for selecting an operation displayed on a page of said menu;*

*response picture data which contains a response picture to be displayed when an operation is selected from the displayed page of said menu;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed,*

*wherein said response picture data is contained in a cell other than said at least one of said plurality of cells containing menu display data.*

*56. The recording medium according to claim 55, wherein said menu control data are consistent with a DVD format.*

*57. A recording medium retaining menu control data for controlling a menu displayed on a screen, wherein said menu control data has a data structure including:*

*first video object defining a display of said menu, said first video object comprising a first cell containing menu display data which determines the configuration and a menu button for selecting an operation displayed on a page of said menu;*

*second video object comprising a second cell;*

*response picture data which contains a response picture to be displayed when an operation is selected from the displayed page of said menu, said response picture data are contained in said second cell;*

*response display data which provides an instruction for displaying the response picture in place of the displayed page of said menu after the operation is selected and before the operation is performed, thereby indicating a transition between the displayed page of said menu and the selected operation; and*

*an operation instruction for performing the selected operation after the response picture is displayed.*

*58. The recording medium according to claim 57, wherein said menu control data are consistent with a DVD format.*

*59. A recording medium retaining menu control data for controlling a menu displayed on a screen, wherein said menu control data has a data structure including:*

*a video object comprising one or more cells;*

*at least one of said one or more cells containing menu display data which determines at least the configuration displayed on a page of said menu;*

*a program chain containing identification data for a corresponding cell;*

*response picture data which contains a response picture to be displayed when an operation is selected from the page of said menu; and*

*command data which provides an instruction for displaying the response picture in place of the page of said menu after the operation is selected and before the operation is performed, thereby indicating a transition between the page of said menu and the selected operation, and provides an instruction for performing the selected operation after the response picture is displayed.*

*60. A recording medium according to claim 59 wherein said command data is contained in at least in one of said program chain and said video object.*

*61. A menu control method for controlling a menu of operations for operating a recording medium, the menu being displayed on a screen, including the steps of:*

*defining a display of a page of said menu by a video object defining a display of said menu; said video object comprising one or more cells; at least one of said one or more cells containing menu display data which determines the configuration and a menu button for selecting an operation displayed on a page of said menu;*

*displaying the page of said menu including the menu button, the displayed menu being determined at least in part on the basis of a previously selected operation;*

*providing an instruction in accordance with response display data for displaying response picture after the operation is selected and before the operation is executed thereby displaying the response picture in place of the page of said menu when the menu button on the page of said menu is selected so as to indicate a transition between the displayed page of said menu and the selected operation; and*

*executing the selected operation of said menu button after said response picture is displayed.*

*62. The menu control method according to claim 61, wherein said recording medium is consistent with a DVD format.*

*63. A menu control apparatus for controlling a menu of operations for operating a recording medium, the menu being displayed on a screen, comprising:*

*a menu display means for displaying a page of said menu including at least one menu button for selecting an operation of said recording medium, the displayed page of said menu being defined by a video object comprising one or more cells; at least one of said one or more cells containing menu display data which determines the configuration and the menu button;*

*a response picture display means for displaying a response picture in place of the page of said menu when the menu button on said menu is selected, thereby indicating a transition between the page of said menu and the selected operation;*

*a means for providing an instruction in accordance with response display data for displaying the response picture after the operation is selected and before the operation is executed; and*

*a means for executing the selected operation of said menu button after said response picture is displayed by said response picture display means.*

*64. The menu control apparatus according to claim 63, wherein said recording medium is consistent with a DVD format.*

*65. A menu control method for controlling a menu of operations for operating a recording medium, the menu being displayed on a screen, including the steps of:*

*defining a display of a page of said menu by a video object defining a display of said menu; said video object comprising a plurality of cells; at least one of said plurality of cells containing menu display data which determines the configuration and a menu button for selecting an operation displayed on a page of said menu;*

*displaying the page of said menu including the menu button, the displayed menu being determined at least in part on the basis of a previously selected operation;*

*providing an instruction in accordance with response display data for displaying response picture after the operation is selected and before the operation is executed thereby displaying the response picture in place of the page of said menu when the menu button on the page of said menu is selected so as to indicate a transition between the displayed page of said menu and the selected operation; and*

*executing the selected operation of said menu button after said response picture is displayed.*

*66. The menu control apparatus according to claim 65, wherein said recording medium is consistent with a DVD format.*

*67. A menu control apparatus for controlling a menu of operations for operating a recording medium, the menu being displayed on a screen, comprising:*

*a menu display means for displaying a page of said menu including at least one menu button for selecting an operation of said recording medium, the displayed page of said menu being defined by a video object comprising a plurality of cells; at least one of said plurality of cells containing menu display data which determines the configuration and the menu button;*

*a response picture display means for displaying a response picture in place of the page of said menu when the menu button on said menu is selected, thereby indicating a transition between the page of said menu and the selected operation;*

*a means for providing an instruction in accordance with response display data for displaying the response picture after the operation is selected and before the operation is executed; and*

*a means for executing the selected operation of said menu button after said response picture is displayed by said response picture display means.*

*68. The menu control apparatus according to claim 67, wherein said recording medium is consistent with a DVD format.*

*69. A menu control method for controlling a menu of operations for operating a recording medium, the menu being displayed on a screen, including the steps of:*

*defining a display of a page of said menu by a video object defining a display of said menu, said video object comprising a cell; said cell containing menu display data which determines the configuration and a menu button for selecting an operation displayed on a page of said menu;*

*displaying the page of said menu including the menu button, the displayed menu being determined at least in part on the basis of a previously selected operation;*

*providing an instruction in accordance with response display data for displaying response picture after the operation is selected and before the operation is executed thereby displaying the response picture in place of the page of said menu when the menu button on the page of said menu is selected so as to indicate a transition between the displayed page of said menu and the selected operation; and*

*executing the selected operation of said menu button after said response picture is displayed.*

*70. The menu control method according to claim 69, wherein said recording medium is consistent with a DVD format.*

*71. A menu control apparatus for controlling a menu of operations for operating a recording medium, the menu being displayed on a screen, comprising:*

*a menu display means for displaying a page of said menu including at least one menu button for selecting an operation of said recording medium, the displayed page of said menu being defined by a video object comprising a cell; said cell containing menu display data which determines the configuration and the menu button;*

*a response picture display means for displaying a response picture in place of the page of said menu when the menu button on said menu is selected, thereby indicating a transition between the page of said menu and the selected operation;*

*a means for providing an instruction in accordance with response display data for displaying the response picture after the operation is selected and before the operation is executed; and*

*a means for executing the selected operation of said menu button after said response picture is displayed by said response picture display means.*

*72. The menu control apparatus according to claim 71, wherein said recording medium is consistent with a DVD format.*

*73. A menu control method for controlling a menu of operations for operating a recording medium, the menu being displayed on a screen, including the steps of:*

*displaying a page of said menu including a menu button for selecting an operation according to a first video object among a plurality of video objects, said first video object defining a display of said menu; said first video object comprising a cell; said cell containing menu display data which determines the configuration and the menu button;*

*providing an instruction in accordance with response display data for displaying response picture after the operation is selected and before the operation is executed thereby displaying the response picture in place of the page of said menu when the menu button on the page of said menu is selected so as to indicate a transition between the displayed page of said menu and the selected operation; and*

*executing the selected operation of said menu button after said response picture is displayed.*

*74. The menu control method according to claim 73, wherein said response picture data is contained in a cell which belongs to a second video object which is different from said first video object.*

*75. A menu control apparatus for controlling a menu of operations for operating a recording medium, the menu being displayed on a screen, comprising:*

*a menu display means for displaying a page of said menu including at least one menu button for selecting an operation of said recording medium, the displayed page of said menu being defined by video objects each comprising a cell; at least one of said video objects defining a display of said menu, a cell of said at least one of said video objects containing menu display data which determines the configuration and the menu button;*

*a response picture display means for displaying a response picture in place of the page of said menu when the menu button on said menu is selected, thereby indicating a transition between the page of said menu and the selected operation;*

*a means for providing an instruction in accordance with response display data for displaying the response picture after the operation is selected and before the operation is executed; and*

*a means for executing the selected operation of said menu button after said response picture is displayed by said response picture display means.*

*76. The menu control apparatus according to claim 75, wherein said recording medium is consistent with a DVD format.*

*77. A menu control method for controlling a menu of operations for operating a recording medium, the menu being displayed on a screen, including the steps of:*

*displaying a page of said menu including a menu button for selecting an operation according to a video object, said video object defining a display of said menu; said video object comprising a plurality of cells; at least one of said plurality of cells containing menu display data which determines the configuration and the menu button;*

*providing an instruction in accordance with response display data for displaying response picture after the operation is selected and before the operation is executed thereby displaying the response picture in place of the page of said menu when the menu button on the page of said menu is selected so as to indicate a transition between the displayed page of said menu and the selected operation; and*

*executing the selected operation of said menu button after said response picture is displayed,*

*wherein said response picture is contained in a cell other than said at least one of said plurality of cells containing menu display data.*

*78. The menu control method according to claim 77, wherein said recording medium is consistent with a DVD format.*

*79. A menu control apparatus for controlling a menu of operations for operating a recording medium, the menu being displayed on a screen, comprising:*

*a menu display means for displaying a page of said menu including at least one menu button for selecting an operation of said recording medium, the displayed page of said menu being defined by a video object comprising a plurality of cells; said video object defining a display of said menu, at least one of said plurality of cells containing menu display data which determines the configuration and the menu button;*

*a response picture display means for displaying a response picture in place of the page of said menu when the menu button on said menu is selected, thereby indicating a transition between the page of said menu and the selected operation;*

*a means for providing an instruction in accordance with response display data for displaying the response picture after the operation is selected and before the operation is executed; and*

*a means for executing the selected operation of said menu button after said response picture is displayed by said response picture display means.*

*80. The menu control apparatus according to claim 79, wherein said recording medium are consistent with a DVD format.*

*81. A menu control method for controlling a menu of operations for operating a recording medium, the menu being displayed on a screen, including the steps of:*

*displaying a page of said menu including a menu button for selecting an operation according to a first video object, said first video object defining a display of said menu; said video object comprising a first cell containing menu display data which determines the configuration and the menu button;*

*providing an instruction in accordance with response display data for displaying response picture after the operation is selected and before the operation is executed thereby displaying the response picture in place of the page of said menu when the menu button on the page of said menu is selected so as to indicate a transition between the displayed page of said menu and the selected operation; and*

*executing the selected operation of said menu button after said response picture is displayed,*

*wherein said response picture is contained in a second cell contained in a second video object.*

*82. The menu control method according to claim 81, wherein said recording medium are consistent with a DVD format.*

*83. A menu control apparatus for controlling a menu of operations for operating a recording medium, the menu being displayed on a screen, comprising:*

*a menu display means for displaying a page of said menu including at least one menu button for selecting an operation of said recording medium, the displayed page of said menu being defined by a first video object comprising a first cell; said video object defining a display of said menu, said first cell containing menu display data which determines the configuration and the menu button;*

*a response picture display means for displaying a response picture in place of the page of said menu when the menu button on said menu is selected, thereby indicating a transition between the page of said menu and the selected operation, said response picture is contained in a second cell contained in a second video object;*

*a means for providing an instruction in accordance with response display data for displaying the response picture after the operation is selected and before the operation is executed; and*

*a means for executing the selected operation of said menu button after said response picture is displayed by said response picture display means.*

*84. The menu control apparatus according to claim 83, wherein said recording medium are consistent with a DVD format.*

* * * * *